US006997056B2

(12) United States Patent
Weiss et al.

(10) Patent No.: US 6,997,056 B2
(45) Date of Patent: Feb. 14, 2006

(54) METHOD AND APPARATUS FOR MEASURING AND ORIENTING GOLF CLUB SHAFT

(75) Inventors: Richard M. Weiss, 9050 SW. 69th Ct., Miami, FL (US) 33156; Joseph H. Butler, Knoxville, TN (US); Michael J. Twigg, Knoxville, TN (US); F. Sherrill Vowell, Clinton, TN (US); Larry R. Palmer, Harriman, TN (US)

(73) Assignee: Richard M. Weiss, Miami, FL (US)

( * ) Notice: Subject to any disclaimer, the term of this patent is extended or adjusted under 35 U.S.C. 154(b) by 0 days.

(21) Appl. No.: 11/144,273

(22) Filed: Jun. 3, 2005

(65) Prior Publication Data
US 2005/0217379 A1 Oct. 6, 2005

Related U.S. Application Data

(62) Division of application No. 10/037,701, filed on Nov. 9, 2001, now Pat. No. 6,915,695.

(60) Provisional application No. 60/247,141, filed on Nov. 10, 2000, provisional application No. 60/263,489, filed on Jan. 22, 2001.

(51) Int. Cl.
G01M 7/02 (2006.01)
A63B 53/00 (2006.01)

(52) U.S. Cl. ........................................ 73/579; 473/289
(58) Field of Classification Search ................. 73/579; 473/289
See application file for complete search history.

(56) References Cited

U.S. PATENT DOCUMENTS

| 1,953,916 | A | 4/1934 | Adams ........................ 265/49 |
| 3,992,933 | A | 11/1976 | Randolph, Jr. ............. 73/141 A |
| 4,122,593 | A | 10/1978 | Braly ........................... 29/407 |
| 4,169,595 | A | 10/1979 | Kaugars .................... 273/80 R |
| 4,517,843 | A | 5/1985 | Leger ........................... 73/847 |
| 4,558,863 | A | 12/1985 | Haas et al. ................. 273/77 A |
| 4,682,504 | A | 7/1987 | Kobayashi .................... 73/854 |
| 4,958,834 | A | 9/1990 | Colbert ...................... 273/77 A |

(Continued)

FOREIGN PATENT DOCUMENTS

DE 4106572 9/1992

*Primary Examiner*—John E. Chapman
(74) *Attorney, Agent, or Firm*—Fish & Neave IP Group of Ropes & Gray LLP; Jeffrey H. Ingerman

(57) ABSTRACT

The preferred orientation, or planar oscillation plane, of a golf club shaft is located by measuring the oscillation of the shaft when an impulse is applied. A reaction mass is mounted on one end of the golf club shaft and is attracted with an electromagnet, and the electromagnet is deactivated in order to initiate vibratory motion. Preferably, the out-of-plane oscillation is measured at a large number of angular positions about the shaft axis, and the principal planar oscillation plane is identified by that pair of opposed angular positions in which the out-of-plane oscillation is smallest. The location of the preferred orientation may be marked on the shaft and used to assemble a golf club with the planar oscillation plane in a predetermined orientation. The straightness of the shaft can also be determined by deriving its spring constant from its oscillation frequency and then measuring the restoring force when the shaft is deflected by the same nominal amount at different angular positions; differences in restoring force can be attributed to differences in actual deflection distance resulting from lack of straightness.

6 Claims, 25 Drawing Sheets

U.S. PATENT DOCUMENTS

| | | | |
|---|---|---|---|
| 5,040,279 A | 8/1991 | Braly | 29/407 |
| 5,379,641 A | 1/1995 | Paasivaara et al. | 73/579 |
| 5,429,008 A | 7/1995 | Matsumoto et al. | 73/862.639 |
| 5,478,073 A | 12/1995 | Hackman | 273/77 A |
| 5,515,717 A | 5/1996 | White | 73/65.03 |
| 5,520,052 A | 5/1996 | Pechersky | 73/579 |
| 5,771,552 A | 6/1998 | Karner et al. | 29/407.1 |
| 5,870,815 A | 2/1999 | Karner et al. | 29/407.1 |
| 5,976,028 A | 11/1999 | Ciccarello et al. | 473/289 |
| 6,183,375 B1 | 2/2001 | Weiss | 473/289 |
| 6,250,168 B1 | 6/2001 | D'Aguanno | 73/865.3 |
| 6,415,502 B1 | 7/2002 | Gunshinan et al. | 29/714 |
| 2001/0027137 A1 | 10/2001 | Weiss | 473/289 |

141 ↘

```
┌─────────────────────────────┐
│ PLACE GOLF CLUB SHAFT IN CHUCK │──150
│ AND RESTRAIN TIP UNDER SHAFT │
│     TIP RESTAINING ARM      │
└─────────────┬───────────────┘
              ▼
┌─────────────────────────────┐
│     ROTATE CHUCK 200°       │──151
│     IN NEGATIVE DIRECTION   │
└─────────────┬───────────────┘
              ▼
┌─────────────────────────────┐
│     ROTATE CHUCK AT LEAST   │──152
│   360° IN POSITIVE DIRECTION│
│     AND ACQUIRE DATA FROM   │
│          LOAD CELL          │
└─────────────┬───────────────┘
              ▼
┌─────────────────────────────┐
│    DETERMINE ANGLE "A" OF   │──153
│         MAXIMUM LOAD        │
└─────────────┬───────────────┘
              ▼
┌─────────────────────────────┐
│       SET START ANGLE       │──154
│         S = A - 90°         │
└─────────────────────────────┘
```

FIG. 15

METHOD AND APPARATUS FOR MEASURING AND ORIENTING GOLF CLUB SHAFT

CROSS REFERENCE TO RELATED APPLICATIONS

This is a division of, commonly-assigned U.S. patent application Ser. No. 10/037,701, filed Nov. 9, 2001, now U.S. Pat. No. 6,915,695, which claims the benefit of U.S. Provisional Patent Applications Nos. 60/247,141 and 60/263,489, filed Nov. 10, 2000 and Jan. 22, 2001, respectively.

BACKGROUND OF THE INVENTION

This invention relates to measuring and orienting a golf club shaft. More particularly, this invention relates to a method and apparatus for automatically and reliably identifying the location of a planar oscillation plane, and particularly the principal planar oscillation plane, of a golf club shaft and for aligning that planar oscillation plane in a desired orientation, as well as for determining parameters of the golf club shaft, such as roundness, stiffness and straightness, that characterize golf club performance.

When a golfer swings a golf club, the shaft of the golf club bends or twists, especially during the downswing. The direction the shaft bends or twists is dependent on how the golfer loads or accelerates the club, but the bending or twisting direction and magnitude also are dependent on the stiffness of the shaft. If a shaft is soft, it will bend or twist more during a given downswing than if it is stiff. Additionally if a shaft exhibits different transverse stiffness in different planes—i.e., the stiffness, roundness and straightness of the shaft are not symmetric—the shaft will bend or twist differently depending upon in which plane (direction) it is loaded.

Immediately prior to the impact of the head of a golf club with a golf ball, the shaft of the golf club goes through significant vibratory movements in both the toe up/down direction (plane perpendicular to the hit direction) and in the lead/lag direction (plane parallel to the hit direction). Research has shown the shaft of a golf club vibrates up and down in the toe up/down direction immediately prior to impact with the golf ball. This up and down movement, known as "vertical deviation oscillation," "vertical deflection oscillation" or "droop oscillation," can be as large as ±1.5 inch (±3.8 cm). Inconsistent bending or twisting makes it more difficult for the golfer to reproduce the downswing shaft bending or twisting from club to club, thereby resulting in less consistent impact repeatability within the set. Because any inconsistent bending or twisting due to asymmetric shaft behavior immediately prior to impact is substantially impossible for the golfer to correct with his or her swing, any reduction in the aforementioned oscillation immediately prior to impact will help the golfer improve his or her impact repeatability, thereby enhancing performance. This is true for golfers of all skill levels.

In addition, a golf club, immediately prior to impact, "springs" forward in the direction of the shot. This is commonly referred to as the "kick" of the shaft. If it is possible to analyze and orient a shaft in a way that the kick direction of vibration is stable, this shaft position would improve the golfer's ability to repeat the impact position with the ball. In other words the shaft would have less of a tendency to "bob" up and down immediately prior to impact thereby improving impact repeatability.

Inconsistent bending or twisting contributes to movements of the club head that would not be present if the shaft had been perfectly symmetric. Golf club shaft manufacturers attempt to build shafts with symmetric stiffness to minimize inconsistent bending or twisting during the swing, but as a result of manufacturing limitations it is difficult to build a perfectly symmetric golf club shaft. Specifically, it is well known that, as a result of irregularities or variations in materials or manufacturing processes, golf club shafts have a preferred angular orientation. For example, it is sometimes said that a golf club shaft has a "spine" whose orientation may be significant. (See, e.g., U.S. Pat. Nos. 4,958,834 and 5,040,279, which are hereby incorporated by reference in their entireties.) Therefore, substantially all golf club shafts exhibit some degree of asymmetry which results in some degree of inconsistent bending or twisting during the swing.

The asymmetry of golf club shafts can result from nonsymmetrical cross sections (shafts whose cross sections are not round or whose wall thicknesses are not uniform), shafts that are not straight, or shafts whose material properties vary around the circumference of the shaft cross section. Because it is substantially impossible to build a perfectly symmetric golf club shaft and the objective is to minimize inconsistencies from club to club in a golf club set and from set to set within a brand, it makes sense, if possible, to analyze each golf club shaft in a set of golf clubs to understand its asymmetric bending or twisting behavior and construct the golf clubs in the set to maximize consistency from club to club within a set and from set to set within a brand.

It has been recognized—e.g., in above-incorporated U.S. Pat. No. 5,040,279—that although substantially all golf club shafts exhibit some degree of asymmetry, substantially every golf club shaft exhibits at least one orientation in which, when the shaft is clamped at its proximal, or handle, end and displaced at the tip, the resultant vibration of the shaft will remain substantially planar. That is, the shaft will remain substantially in a single plane and the tip of the shaft will vibrate back and forth substantially along a line.

It is also recognized in above-incorporated U.S. Pat. No. 4,958,834 that the construction of all golf clubs within a set with their respective planar oscillation planes ("POPs") oriented in the same angular direction relative to their respective club faces will exhibit less inconsistency in shaft bending or twisting during the downswing than a set that has been haphazardly or randomly constructed. In particular, a set of golf clubs normally will function best if the respective preferred angular orientations of the respective golf club shafts are aligned in the "hit direction"—i.e., substantially perpendicularly to the respective golf club faces.

However, heretofore there has not been any convenient automated way to determine with consistency the parameters of a golf club shaft that would allow manufacturers or others to predict the performance of a golf club shaft. And while copending, commonly-assigned U.S. patent application Ser. No. 09/494,525, filed Feb. 1, 2000, which is hereby incorporated by reference in its entirety, showed a method and apparatus for determining the preferred angular orientation of a golf club shaft, that method and apparatus were partly manual, and relied on an iterative technique which, in identifying a planar oscillation plane, could identify a planar oscillation plane other than the principal planar oscillation plane. It would be desirable to be able to provide a method and apparatus for quickly and reliably determining the preferred angular orientation of a golf club shaft. It also would be desirable to be able to provide a method and apparatus for using the determination of the preferred angular orientation to automatically assemble golf clubs with each respective golf club shaft consistently aligned relative to the respective club face. It would further be desirable to be able to determine parameters of a golf club shaft to allow prediction of golf club performance.

SUMMARY OF THE INVENTION

It is an object of this invention to attempt to provide a method and apparatus for quickly and reliably determining the preferred angular orientation of a golf club shaft.

It is also an object of this invention to attempt to provide a method and apparatus for using the determination of the preferred angular orientation—e.g., the planar oscillation plane, esp. the principal planar oscillation plane—to assemble golf clubs (manually or automatically) with each respective golf club shaft consistently aligned relative to the respective club face.

It is further an object of this invention to attempt to determine parameters of a golf club shaft to allow prediction of golf club performance.

In accordance with the present invention, there is provided a method of determining a preferred angular orientation of a golf club shaft about a longitudinal axis thereof, where the golf club shaft has a proximal end for gripping by a golfer and a distal end for attachment to a golf club head. According to the method, the proximal end of said golf club shaft is immobilized, and vibratory motion of the distal end of the golf club shaft is initiated in a direction other than parallel to the longitudinal axis. The vibratory motion is analyzed, and from the analyzed vibratory motion the preferred angular orientation is calculated. The golf club shaft can then be marked to indicate the preferred angular orientation. In a further method according to the invention, the mark on the shaft indicating the preferred angular orientation can be used to manually or automatically assemble a golf club with the golf club shaft in a predetermined alignment relative to the face of the golf club head.

Apparatus for determining the preferred angular orientation, and for assembling golf clubs, are also provided.

In a particularly preferred method and apparatus, the vibratory motion of the golf club shaft is analyzed at a plurality of angular positions about the longitudinal axis of the shaft. The greater the number of positions, the more accurately the planar oscillation plane—and particularly the principal planar oscillation plane—can be detected. In addition, at each position, the vibration frequency of the shaft, which is a measure of its stiffness, can be determined. In addition, if the shaft is deflected from its longitudinal axis, then by measuring, at each angular position, the restoring force opposing the deflection, and the amount of shaft deflection, one can determine the straightness of the shaft or, more particularly, the degree to which it is not straight. Roundness, straightness and stiffness are parameters that characterize the performance of a golf club shaft, and shaft manufacturers have sought ways to accurately determine these parameters.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 15 is a flow diagram of a load test performed according to the invention as part of the method of FIG. 14;

DETAILED DESCRIPTION OF THE INVENTION

Figure 1:
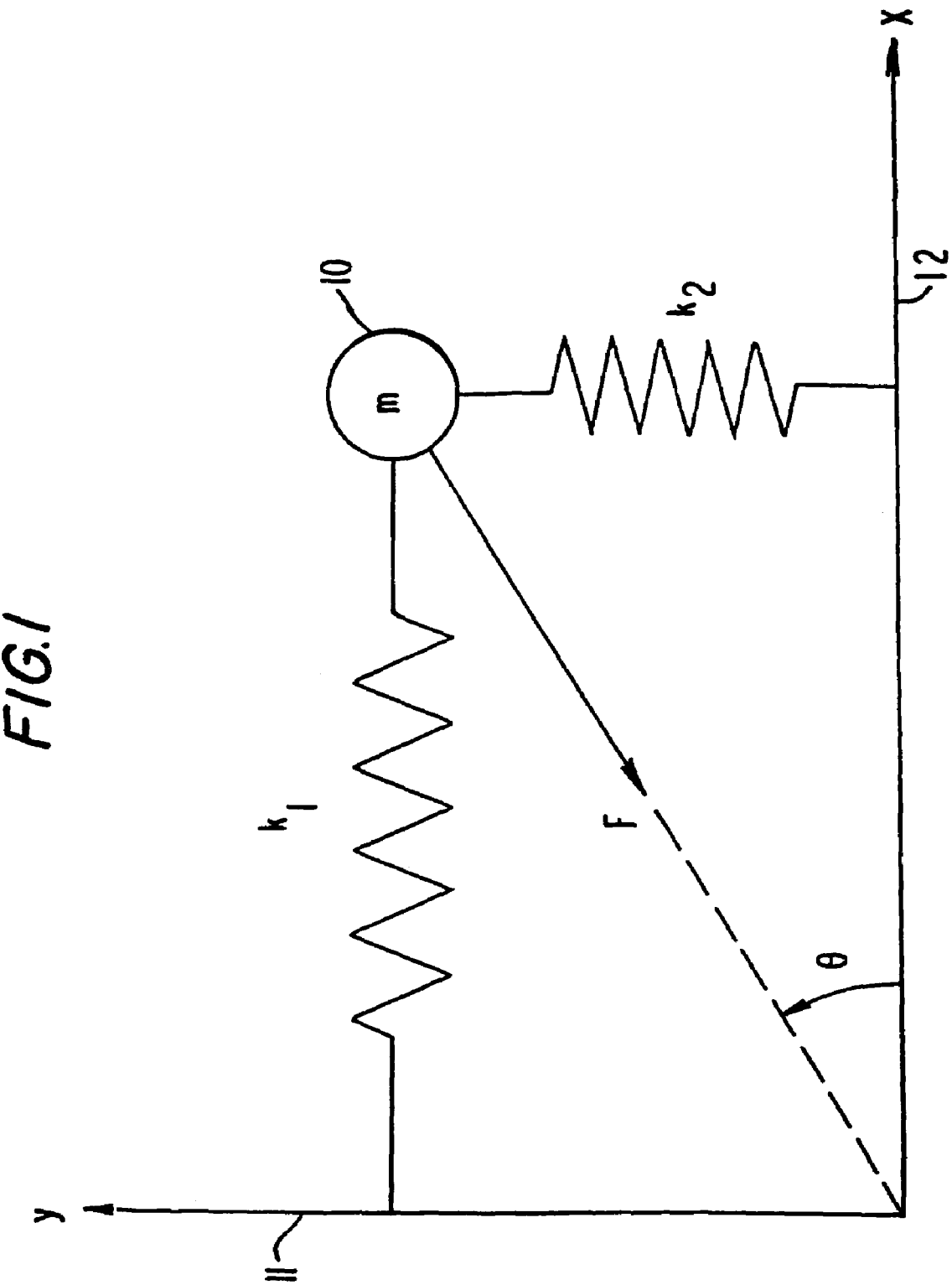
FIG. 1 is a diagram in which a flexible golf shaft is modeled as a mass to which springs are attached.

If a golf club shaft is immobilized at its handle end and displaced in a direction perpendicular to its longitudinal axis, then if the displacement direction lies in a planar oscillation plane of the shaft, the shaft will vibrate in that plane and, viewed end on, the distal tip of the shaft will oscillate back and forth along a line. For convenience, that line can be referred to as the x-axis. However, if the displacement direction is in a plane other than a planar oscillation plane, the distal tip of the shaft will vibrate in a motion having components along the x-axis as well as along an axis perpendicular to the x-axis, which for convenience can be referred to as the y-axis. This motion could be described as an "orbital" motion, although rather than tracing a single ellipse or other closed curve, the tip will move within an envelope such that, if the motion would not damp out (as it in reality does), it would be expected that the tip eventually would move through every point within that envelope.

As described below, by observing the tip vibration of the shaft, one can calculate mathematically the orientation of the planar oscillation plane or planes. Having located the planar oscillation plane or planes, one can then assemble a golf club, orienting the shaft relative to the golf club head so that a planar oscillation plane, and particularly the principal planar oscillation plane, is lined up along the "hit direction"—i.e., substantially perpendicular to the hitting face of the club head—or 180° opposite to that direction. It is also possible, having located a planar oscillation plane of a golf club shaft, to align that planar oscillation plane relative to the golf club head not along the hit direction, but in another predetermined direction.

For example, it may be desirable to align the shaft for a particular golfer to correct or induce a hook or a slice. Thus, for a right-handed golf club, to induce a hook or correct a slice, one would rotate the shaft counterclockwise (looking down the shaft toward the club head), and to induce a slice or correct a hook, one would rotate the shaft clockwise. For a left-handed golf club, the directions of rotation would be reversed. The amount of rotation preferably should be less than about 90°.

It has been observed empirically that a golf club shaft functions as though it is "harder" in one direction along any planar oscillation plane than it is in the opposite direction along that planar oscillation plane. This "harder" side of the planar oscillation plane of the shaft can be referred to as the "hard" or "forward" side of the planar oscillation plane, while the less hard side, 180° opposite the hard side, can be referred to as the "soft" or "rear" side of the planar oscillation plane. It has also been observed that orienting a planar oscillation plane perpendicular to the club head face may yield different results as compared to a haphazard or random alignment. It has further been observed that aligning the planar oscillation plane perpendicular to the club head face with the hard side of the planar oscillation plane facing toward the club head face yields a different result than aligning the planar oscillation plane perpendicular to the club head face with the soft side of the planar oscillation plane facing toward the club head face. Moreover, if every golf club in a set of golf clubs is similarly aligned, there is a greater likelihood that the user of those clubs will be able to achieve more uniform and consistent results across all golf clubs in the set, which can be expected to result in performance enhancement.

In addition, it has been observed empirically that a golf club shaft may have several planar oscillation planes. However, it has been found that there is a principal planar oscillation plane ("PPOP"), which also may be referred to as the plane of uniform repeatability ("PURE"). Golf clubs aligned based on the principal planar oscillation plane can be expected to result in optimal performance enhancement.

Although it is possible to derive the orientation of the planar oscillation plane or planes precisely using mathematical techniques based on data collected by displacing the shaft tip and allowing the shaft to vibrate, it is computationally simpler to derive the orientation by an iterative technique as described below. The iterative technique can be carried out using equipment that induces vibration of a golf club shaft at a plurality of angular orientations, measuring the tip oscillation at each orientation. The equipment can be partially manually operated, in that the shaft is rotated manually to a new orientation for measurement, or equipment can be used in which the rotation of the shaft to each subsequent position, after completion of measurements at the prior position, is performed automatically. If the rotation of the shaft is performed automatically, the equipment can be operated more quickly, allowing the golf club shaft to be measured in more angular orientations, which can be expected to produce a more accurate determination of the principal planar oscillation plane.

The preferred direction of a planar oscillation plane—i.e., in the case of the principal planar oscillation plane, the "hard" side of the golf club shaft—cannot be determined mathematically from mere observation of the shaft tip. Therefore, in a preferred embodiment of the invention, the handle or butt end of the golf club shaft is immobilized, the tip of the shaft is displaced perpendicular to the longitudinal axis, and the restoring force—i.e., the force tending to move the tip back to its neutral position—is measured while the shaft is rotated, from the handle end, through at least about 360°. The angle at which the restoring force is greatest is an indication of the hard side of the shaft. Although this angle usually will not align precisely with the orientation of the principal planar oscillation plane, it will indicate which of the two possible orientations of the principal planar oscillation plane corresponds to the hard side of the principal planar oscillation plane. Moreover, starting one's analysis at the angle of maximum load can be expected to lead one to find the principal planar oscillation plane rather than one of the other planar oscillation planes of the shaft. This is particularly true in an embodiment in which the shaft oscillation is measured at only a relatively few angular positions, such as the partially manual embodiment discussed above. The initial position is less important in an embodiment in which measurements are taken at relatively more angular positions, such as the embodiment described above in which rotation of the golf club shaft from position to position is carried out automatically. In either case, the starting orientation also can be selected arbitrarily.

Once the preferred angular orientation of the golf club shaft has been determined, one or more marks preferably are made on the shaft to indicate the preferred angular orientation. The mark or marks may be made at the location of a planar oscillation plane, or at a predetermined relative position with respect to a planar oscillation plane. Each mark can be made using ink or paint, or can be etched into the surface of the shaft using another technique, such as a mechanical, electrostatic or laser marking technique, or a marked label (e.g., a sticker or decal) can be applied. Once the mark or marks have been made, they can be used to align the shaft relative to a golf club head when assembling a golf club, so that the marked planar oscillation plane of the golf club shaft is substantially perpendicular to, or at some other desired orientation with respect to, the club head face.

The alignment of the shaft to the club head can be performed manually. Preferably, alignment is facilitated by providing a marking on the club head as well, on or near the hosel or bore, to which a marking on the shaft can be aligned to form a properly "spine-aligned" golf club. Alternatively, in another preferred embodiment, an assembly machine mates a golf club head to a golf club shaft, matching up the alignment markings in the process. In this embodiment, the golf club head can be attached to the shaft immediately after determination of the preferred angular orientation of the shaft, with the shaft still in the chuck of the planar oscillation plane locating station (in that case, the application of a visible mark to the shaft exterior can be omitted, although it would still be useful for later repair operations when the club is disassembled). Alternatively, in a second variant of this embodiment, the shaft can be removed from the planar oscillation plane locating station and moved to a club assembly station. This variant better accounts for any speed differential between the planar oscillation plane locating process and the club assembly process. If the planar oscillation plane locating process is faster than the club assembly process, more club assembly stations than planar oscillation plane locating stations can be provided. If the club assembly process is faster than the planar oscillation plane locating process, more planar oscillation plane locating stations than club assembly stations can be provided. In either case, it is preferable to provide a hopper or other intermediate station for holding spine-aligned shafts between the planar oscillation plane locating station and the club assembly station. Normally, one would expect few shafts to be held in the hopper, but if for some reason there is a breakdown or other bottleneck at or downstream of the club assembly station or stations, the hopper can serve, until it is full, as a reservoir to accept shafts from the planar oscillation plane locating station or stations.

In addition to locating the planar oscillation plane(s) of golf club shafts, whether for re-alignment of existing golf clubs or for the assembly of new golf clubs, the present invention, and particularly the embodiment described above in which rotation of the shaft from one angular position to another for measurement purposes is automated, allowing measurements to be taken at more angular positions, provides the ability to measure certain characteristics of a shaft that can be used to monitor the shaft manufacturing process and the quality of the resulting shafts. These measurements can provide a qualification standard for golf shaft manufacture.

Specifically, at each angular position, when the shaft if deflected and allowed to vibrate, the frequency of the shaft vibration can be measured. This can be done simply by counting the number times in a given time interval that the vibrating shaft passes a fixed point. One way to perform that counting function is to provide a light source and a photo-detector and to count the number of times during the given time interval that the beam from the light source is interrupted by the vibrating shaft. In an alternative preferred method, the oscillations recorded by accelerometer data (see below) within a particular time interval can be counted.

Once the characteristic vibration frequency has been determined, the spring constant of the shaft, which is a measure of its stiffness, can be approximated by treating the shaft as a prismatic beam of mass M and deriving the spring constant, k, from the frequency, f, using the relationship $f \approx (k/M)^{0.5}$. The stiffness of the shaft can then be characterized by the value of k at each angle, all as described in more detail below.

At each angular position, a load test can also be administered, by deflecting the shaft through a fixed distance, d, transverse to its longitudinal axis and measuring the restoring force, F, generated. From the force, F, and the spring constant, k, determined above, one can determine the deviation, $\delta$, which is a measure of the straightness of the shaft, from the relation $F/k=d+\delta$. The straightness of the shaft can then be characterized by the value of $\delta$ at each angle, all as described in more detail below.

The invention will now be described with reference to FIGS. 1–24.

If the handle end of a golf club shaft is clamped in a clamp that holds the shaft horizontally, then looking toward the tip of the distal end of the shaft, the shaft stiffness can be modeled, as shown in FIG. 1. As seen in FIG. 1, shaft 10 can be considered as a mass m having two springs of different spring constants $k_1$ and $k_2$ connecting it in two orthogonal directions to two different surfaces 11, 12. If shaft 10 were symmetrically stiff, then $k_1$ and $k_2$ would be equal. Normally, however, $k_1$ and $k_2$ are different. In fact, if one were to clamp the shaft in several different orientations, and each time measure the horizontal and vertical restoring forces, one might get different sets of values for $k_1$ and $k_2$. The force F, as shown, is the force imposed to displace the tip of clamped shaft 10, e.g., to cause the tip to oscillate.

Figure 2:
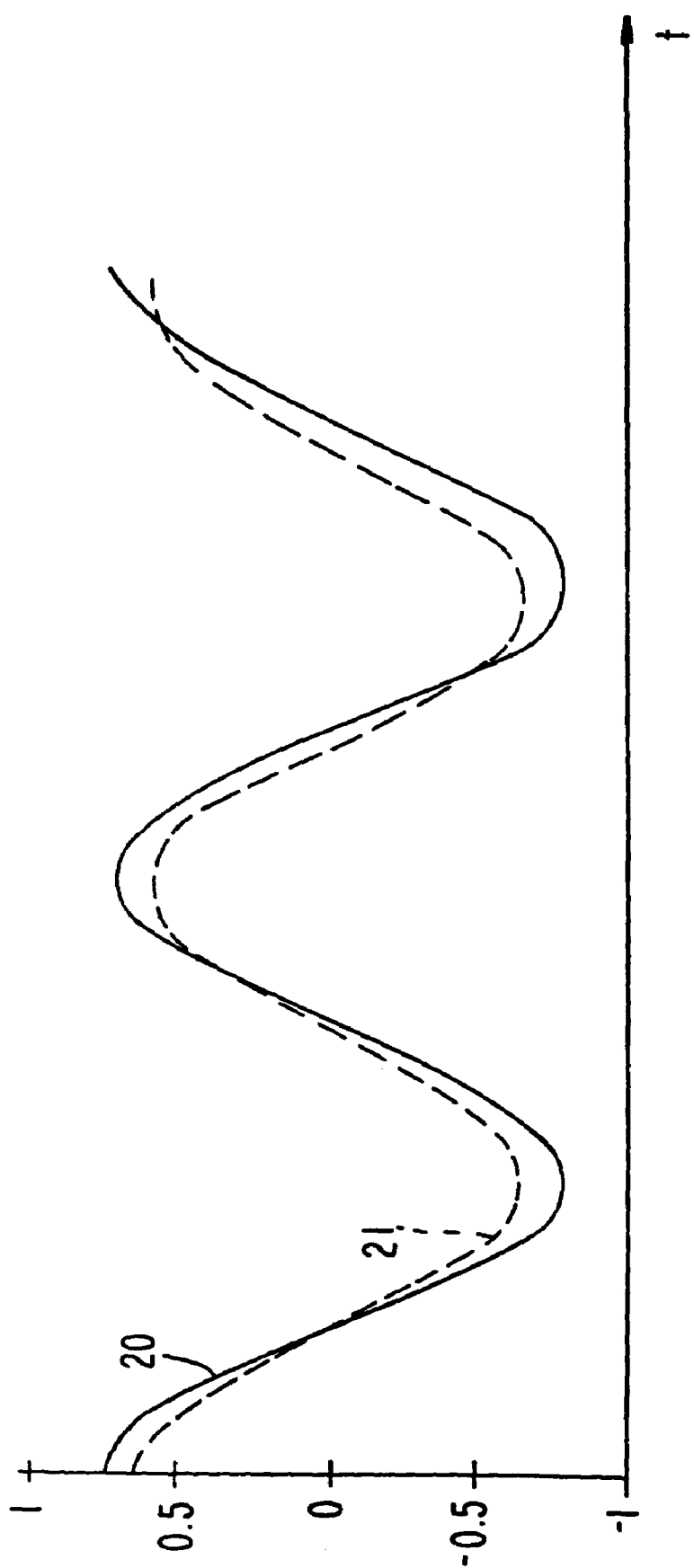
FIG. 2 shows the horizontal and vertical displacement, seen end-on, of the shaft of FIG. 1 as a function of time, over two oscillation cycles after an impulse is delivered to cause the shaft to oscillate.
Figure 3:
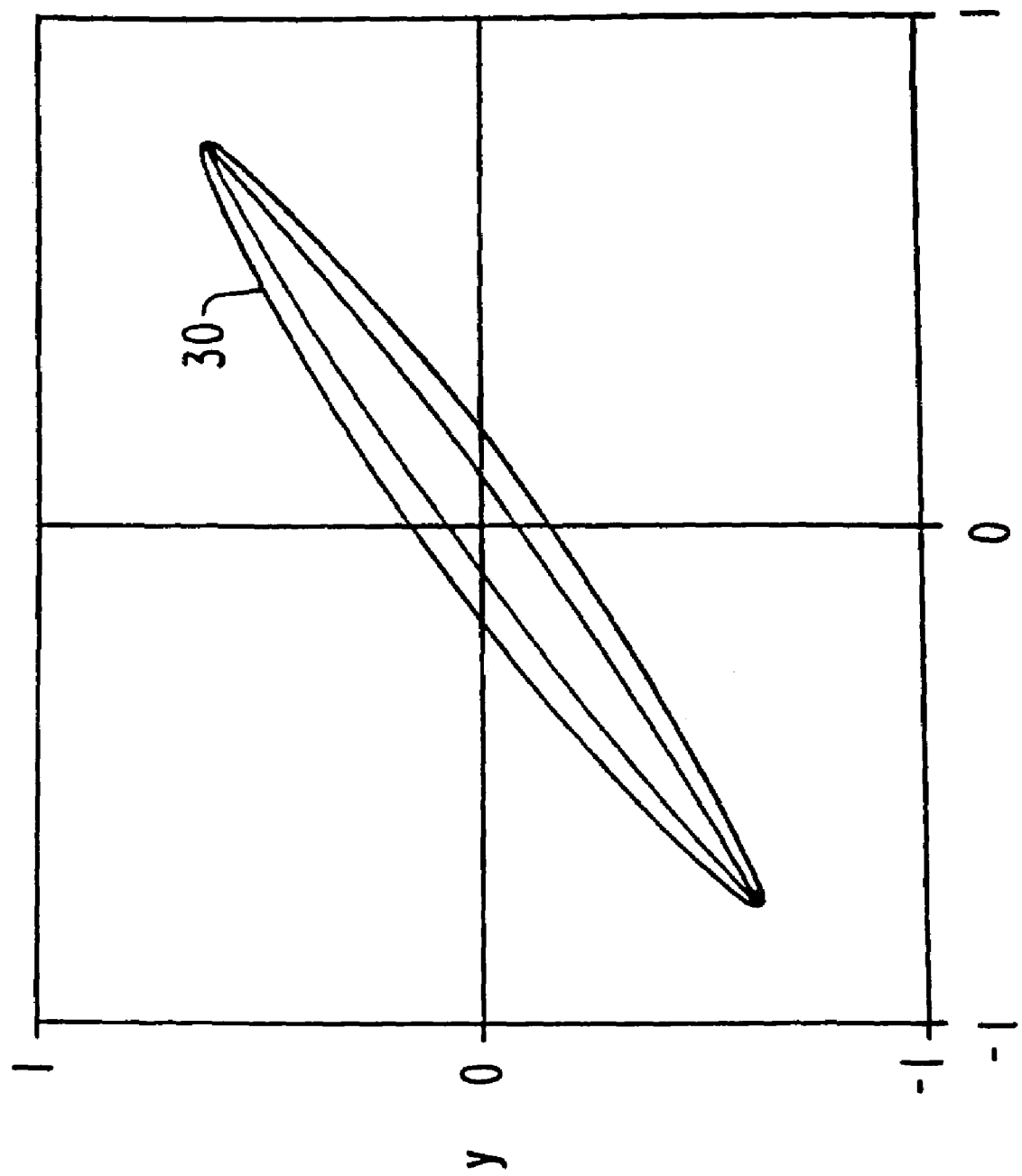
FIG. 3 shows the motion diagramed in FIG. 2 as a phase plot.
Figure 4:
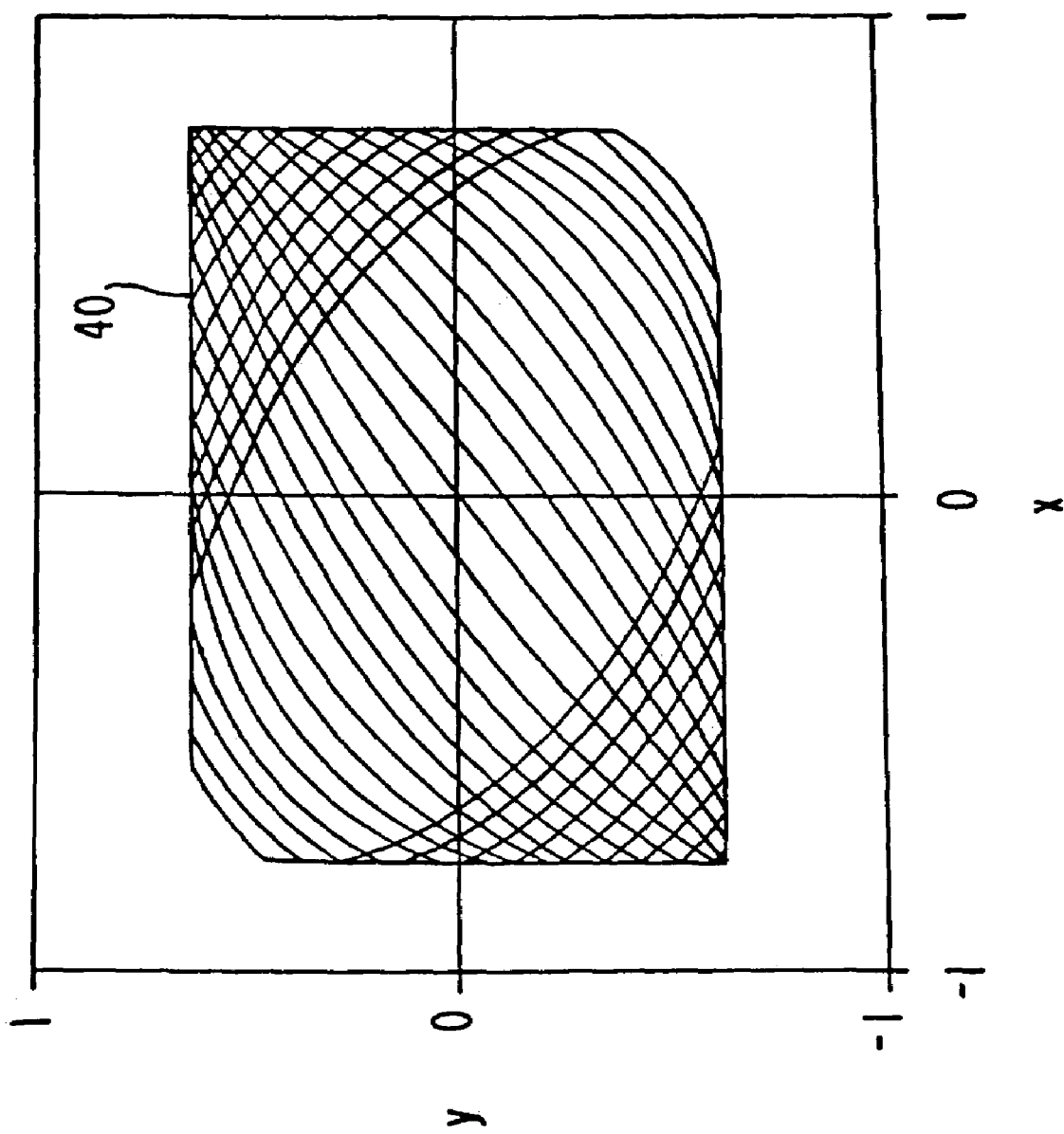
FIG. 4 shows the motion of the shaft as a phase plot, after fourteen oscillation cycles.

FIG. 2 shows the normalized horizontal and vertical displacement of the vibrating tip of shaft 10 as a function of time over two oscillation cycles, with horizontal displacement (x) represented by the solid line 20 and vertical displacement (y) represented by the broken line 21, assuming the initial displacing force is imposed at an angle θ=40° to the horizontal. FIG. 3 shows the same displacement of the tip of shaft 10 as a phase plot 30, over two cycles, in x and y—i.e., FIG. 3 shows two cycles of the path the tip follows as it would be seen by an observer viewing the tip along the longitudinal axis of shaft 10, looking toward the handle end. FIG. 4 shows the phase plot 40 after fourteen cycles. Analysis of these observed motions yields the location of the planar oscillation plane—i.e., the angular orientation of shaft 10 in which, if the initial displacing force F were applied along that orientation, shaft 10 would oscillate substantially only along that orientation, with the tip tracing back and forth substantially along a line.

As seen in FIG. 4, the phase plot 40 of the tip motion after a sufficient number of cycles is substantially a rectangle. The orientation of the planar oscillation plane is that of one of the two orthogonal axes of that rectangle, where each axis of a rectangle is defined as a line midway between, and parallel to, a respective pair of sides of the rectangle. In the case of a true rectangle, it would be sufficient to determine the orientations of the sides, as the orientations of the sides and the axes, according to the definition just set forth, are identical. However, the phase plot 40 of the tip motion of a golf shaft may not be a true rectangle, unless one observes an infinite number of cycles, which is impractical because, first, it would not be commercially acceptable and, second, the oscillations of the golf club shaft ordinarily damp out before a true rectangle could be observed. Therefore, the orientation of each of the two axes may be calculated by assuming that lines drawn through the four vertices of the quasi-rectangular shape of the phase plot are the diagonals of the rectangle.

Having found the two axes of the rectangle, it is desirable to determine which one is the major axis, which may correspond to the principal planar oscillation plane, and which is a minor axis—i.e., one of one or more less stable planar oscillation planes. This can be determined rigorously by measuring the oscillation frequencies along those two axes, as described below. The major axis would be expected to correspond to the principal planar oscillation plane if the shaft was caused to vibrate along a direction determined by measuring the load on the deflected shaft as function of angle, and choosing the angle of maximum load as the direction in which to vibrate the shaft. It should be noted that this "load test" could be carried out by clamping either the tip or distal end, or the handle or proximal end, of the shaft, and measuring the load as a function of angle with the unclamped end deflected. However, the subsequent steps of locating the planar oscillation plane preferably are carried out with the handle or proximal end clamped, and therefore the load test preferably is carried out that way as well. It should also be noted that if the load test is not carried out, one may find a planar oscillation plane, but that planar oscillation plane likely will not be the principal planar oscillation plane.

Figure 5:
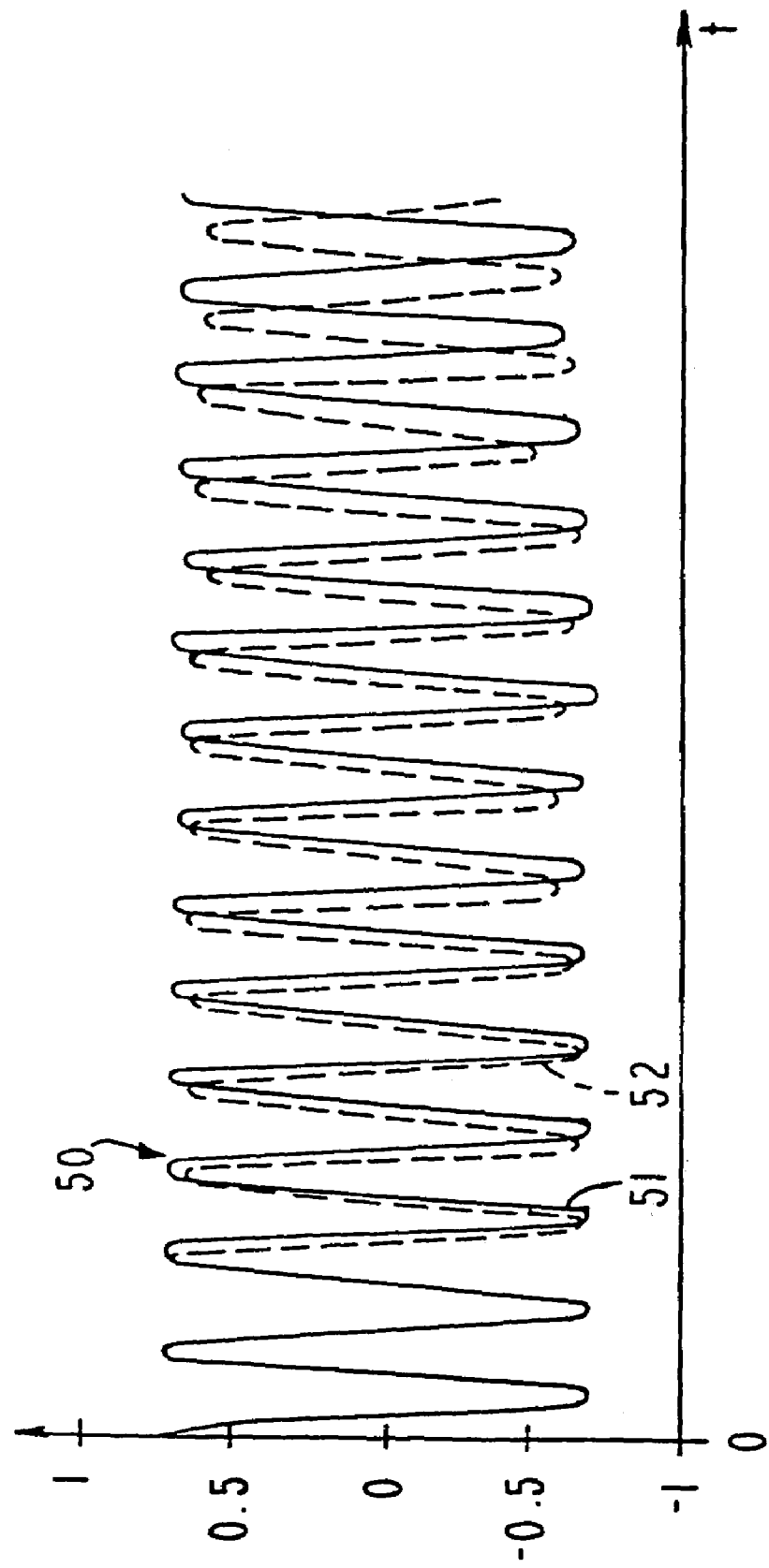
FIG. 5 shows the motion diagramed in FIG. 4, but as a function of time.

FIG. 5 shows a plot 50 of tip oscillation as a function of time, with a separate trace 51 for oscillations measured along the horizontal (x) axis and a separate trace 52 for oscillations measured along the vertical (y) axis. From these traces, frequency can be determined—e.g., graphically by counting the positive-going zero crossings. However, these horizontal and vertical axes x and y are offset from the planar oscillation plane by an angle determined as described above. If that angle is denoted θ, then the frequencies along these axes x and y as determined from the plot in FIG. 5 can be transformed into the coordinate system of the golf club shaft, having axes x' and y' that correspond to a stable planar oscillation plane and one of one or more unstable planar oscillation planes, as follows, where $f_1$ is the frequency at an angle θ from the x-axis—i.e., along the x'-axis, and $f_2$ is the frequency at an angle θ from the y-axis (θ+90° from the x-axis)—i.e., along the y'-axis:

$$f_1 = \left| \frac{f_x f_y (-f_y^2 \cos^2\theta + 2f_y^2 \cos^4\theta - 3f_x^2 \cos^2\theta + 2f_x^2 \cos^4\theta)^{0.5}}{f_y^2 \cos^2\theta + f_x^2 \cos^2\theta - f_x^2} \right|$$

$$f_2 = \left| \frac{f_x f_y (f_y^2 - 3f_y^2 \cos^2\theta + 2f_y^2 \cos^4\theta - f_x^2 \cos^2\theta + 2f_x^2 \cos^4\theta)^{0.5}}{f_y^2 \cos^2\theta + f_x^2 \cos^2\theta - f_x^2} \right|$$

If $f_1$ is greater than $f_2$, then one of the stable planar oscillation planes of the golf club shaft is at an angle θ with respect to the x-axis. If $f_1$ is less than $f_2$, then one of the stable planar oscillation planes of the golf club shaft is at an angle θ with respect to the y-axis—i.e., θ+90° with respect to the x-axis. If the load test has been performed and used to determine the initial angle of vibration, then the stable planar oscillation plane so located can be expected to be the principal planar oscillation plane.

Although this mathematical technique, for determining which of the planar oscillation planes already identified is the principal planar oscillation plane, is rigorous and precise, it does not include all of the parameters that may affect shaft oscillation. Therefore, in another preferred embodiment of the invention, as described above and in more detail below, the location of the principal planar oscillation plane is located to a first-order approximation—i.e., at least to within the correct quadrant—by determining the orientation of the direction of greatest resistance to bending of the golf club shaft. This has the further benefit of quickly identifying the "hard" side of the principal planar oscillation plane, as described above.

A first preferred embodiment of apparatus 60 for implementing the present invention is shown in FIGS. 6–13. Although apparatus 60 could be made to implement the rigorous mathematics set forth above, it has been determined in practice that a simpler iterative process as described below achieves acceptable results at lower cost. Therefore, in a particularly preferred embodiment, apparatus 60 uses that simpler process.

Figure 6:
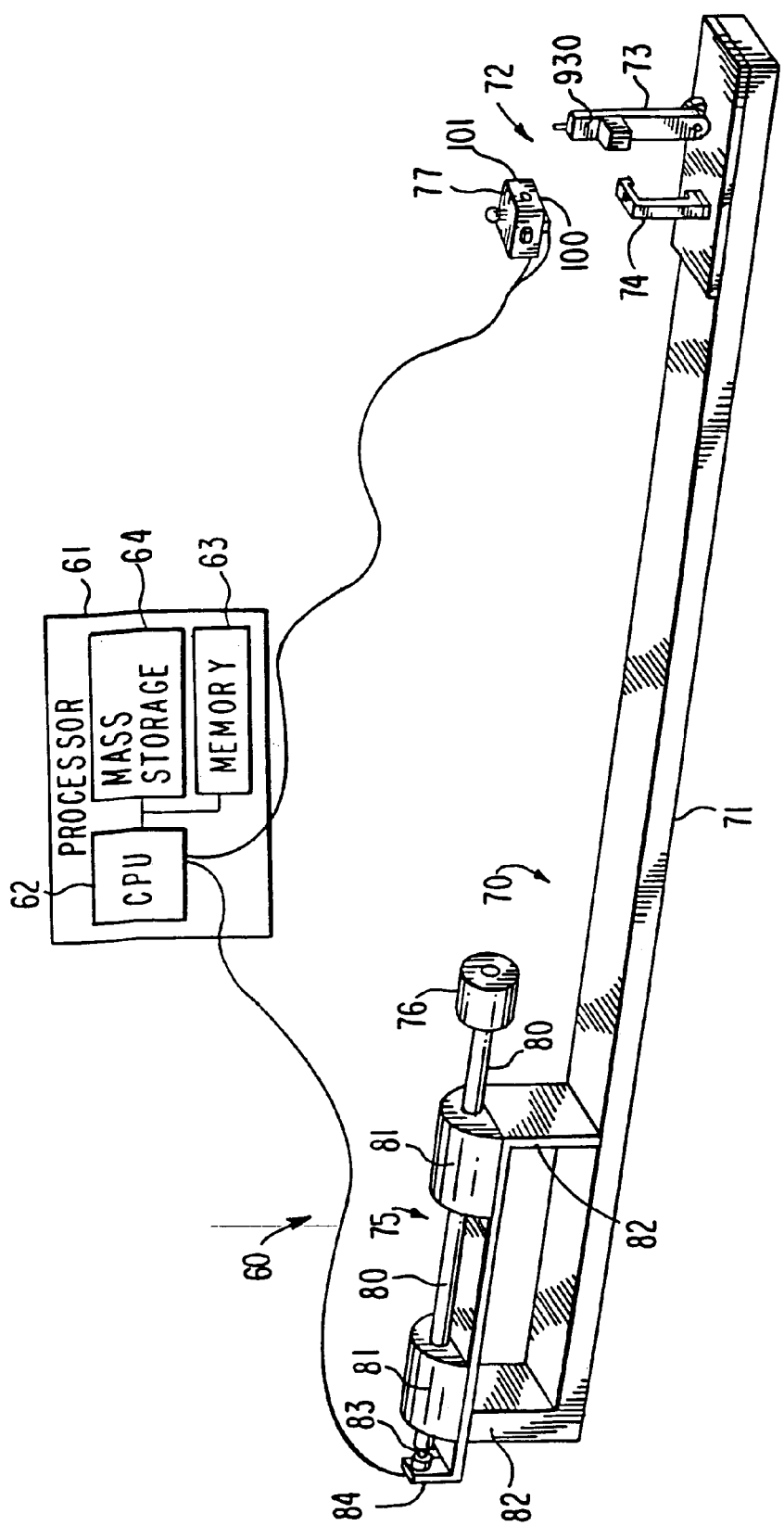
FIG. 6 is a perspective view of a first preferred embodiment of apparatus according to the present invention for determining the preferred orientation of a golf club shaft.
Figure 7:
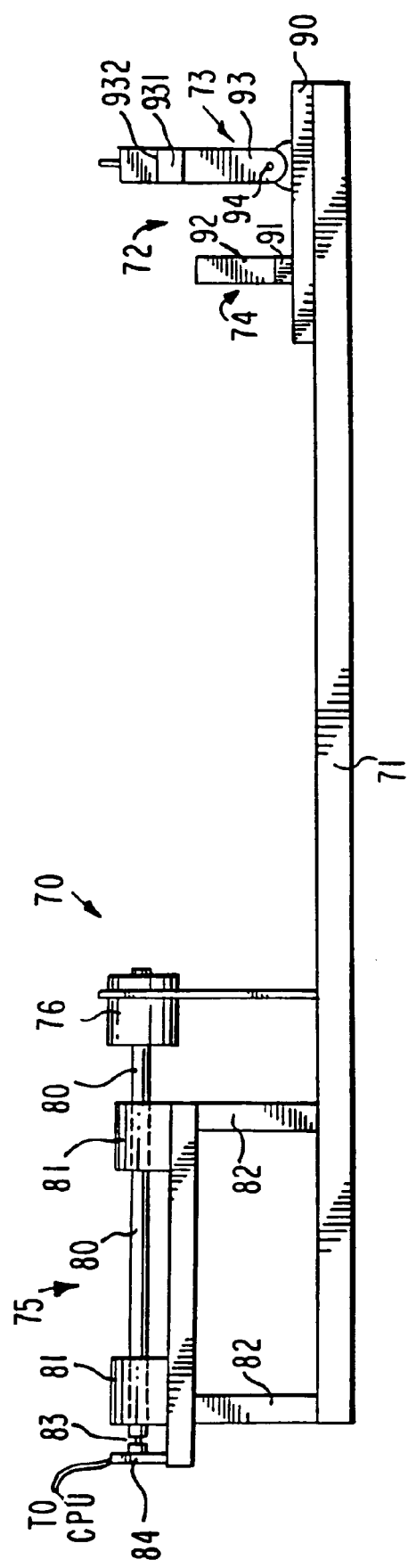
FIG. 7 is a perspective view of a shaft testing assembly of the apparatus of FIG. 6.

In this preferred embodiment, apparatus 60 includes shaft testing assembly 70 and processing unit 61. Processing unit 61 can be any system capable of processing input data from sensors 74 and 77 of shaft testing assembly 70 and performing either the rigorous mathematical calculations described above or the simpler iterative calculations described below. As shown in FIG. 6, processor 61 is preferably a general purpose computer such as a personal computer, which may, e.g., be based on a PENTIUM® central processing unit (CPU) 62 available from Intel Corporation, of Santa Clara, Calif., running a version of the WINDOWS® operating system available from Microsoft Corporation, of Redmond, Wash., and programmed with software as described below. However, processor 61 could also be hard-wired circuitry or one or more programmed programmable logic devices dedicated to the functions necessary to locate the planar oscillation plane or planes of a golf club shaft. In any event, processor 61 preferably also includes memory 63 and mass storage 64, as well as interfaces for the sensors described below.

Shaft testing assembly 70 preferably includes an elongated base 71, which is at least as long a golf club shaft. At one end of base 71 is a measurement assembly 72, including a deflector assembly 73 and a deflection load sensor 74. At the other end of base 71 is a shaft holding and rotating assembly 75, including a rotatable chuck 76 for holding a golf club shaft. Apparatus 60 also includes a tip mass and sensor assembly 77 which during testing of a golf club shaft is mounted on the distal end of the golf club shaft and cooperates with deflector assembly 73.

Figure 8:
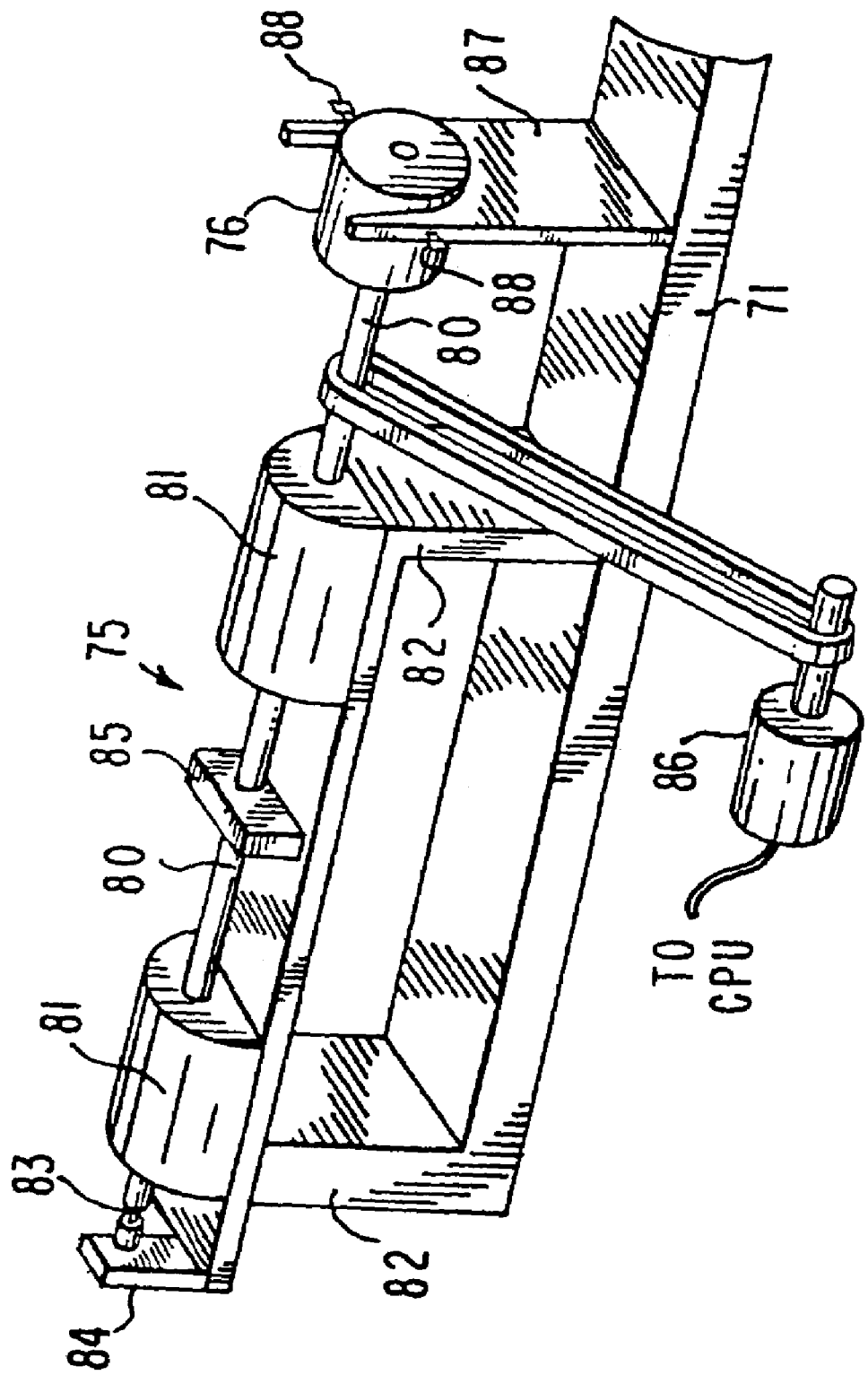
FIG. 8 is a perspective view of a shaft holding and rotating assembly of the apparatus of FIGS. 6 and 7.

As seen in FIG. 8, shaft holding and rotating assembly 75 preferably includes rotatable chuck 76 which preferably may be conventional, preferably holding a golf club shaft by exerting radially inward force substantially evenly around the shaft circumference. Chuck 76 preferably is mounted at the end of axle 80, which preferably is journalled in bearings 81. Bearings 81 preferably are mounted on supports 82 so that the axis of rotation of axle 80, and by extension that of chuck 76 and the golf club shaft being tested, is at a predetermined height above base 71. The end of axle 80 remote from chuck 76 preferably is connected via universal joint 83 to a potentiometer 84 that is used as an angular position sensor as described below. Universal joint 83 prevents any slight misalignment between the axis of axle 80 and the shaft of potentiometer 84 from damaging potentiometer 84. Similarly, a traveling nut 85 preferably is provided on axle 80 to act as a rotational stop to limit rotation of axle 80 and thereby prevent damage that might result from overrotation of potentiometer 84. An optional motor 86 may be provided to rotate chuck 76, although manual rotation can also be used. In addition it is preferable to provide a clamp 87 to minimize vibrations of chuck 76 as it rotates. Clamp 87 preferably provides a friction fit to chuck 76 that is just light enough to allow rotation of chuck 76. Screws 88 may be provided to adjust the jaw of clamp 87.

Figure 9:
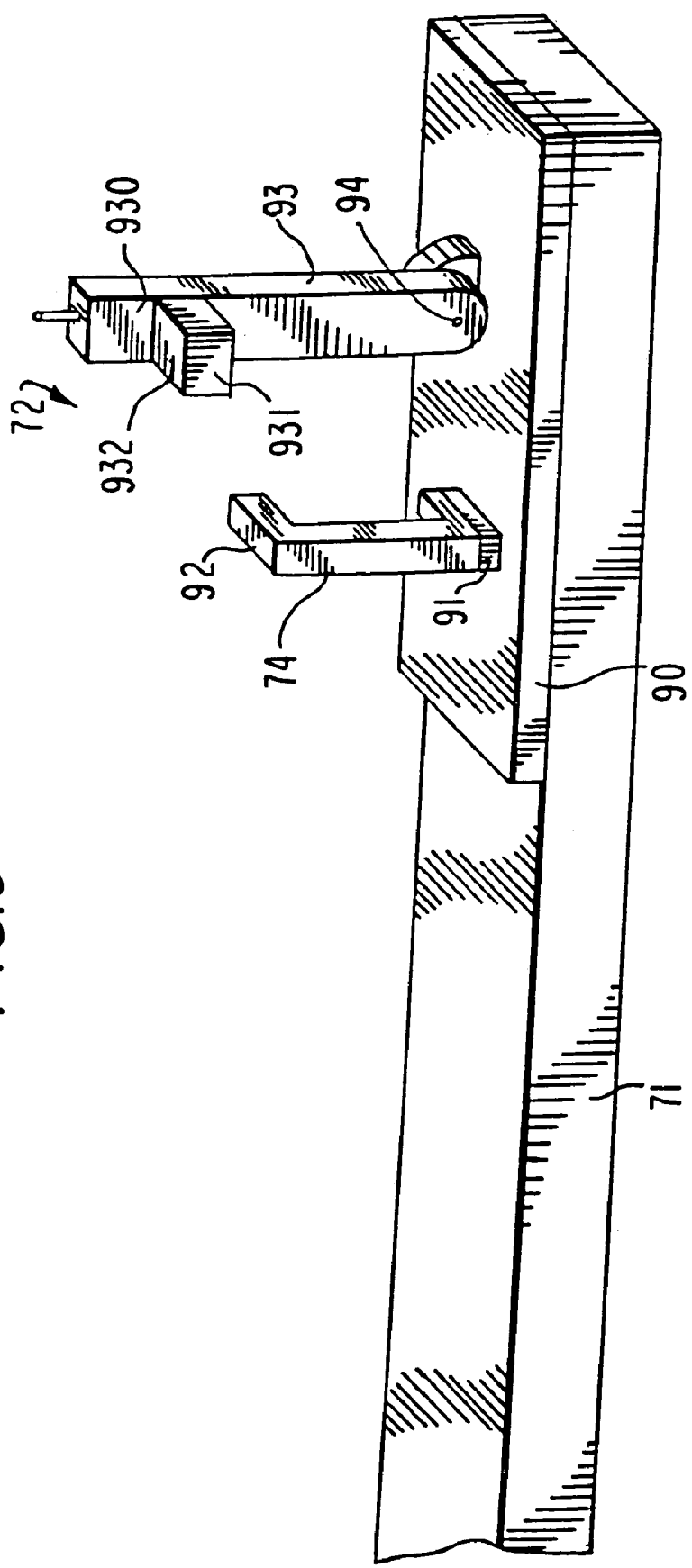
FIG. 9 is a perspective view of a measurement assembly of the apparatus of FIGS. 6–8.

As seen in FIG. 9, measurement assembly 72 includes a base plate 90 that is mounted to base 71. A load cell 91, such as a Model LCAE-2KG, available from Omega Engineering, Inc., of Stamford, Conn., is mounted to base plate 90, and a shaft tip restraining arm 92 is mounted to load cell 91 on the side of load cell 91 opposite base plate 90, for a purpose to be described below. Measurement assembly 72 also preferably includes a deflector arm 93 pivotably mounted to base plate 90. Preferably, deflector arm 93 is mounted so that at least one side 930 thereof is substantially perpendicular to base plate 90, and so that it pivots about an axis 94 that is substantially parallel to base plate 90.

Deflector arm 93 preferably has a projection 931, preferably extending from side 930 thereof. Projection 931 preferably has a surface 932 facing away from axis 94 that bears substantially the same angular relationship to side 930 as does side 100 of tip mass and sensor assembly 77 to side 101 of tip mass and sensor assembly 77, for reasons described below.

Figure 10:
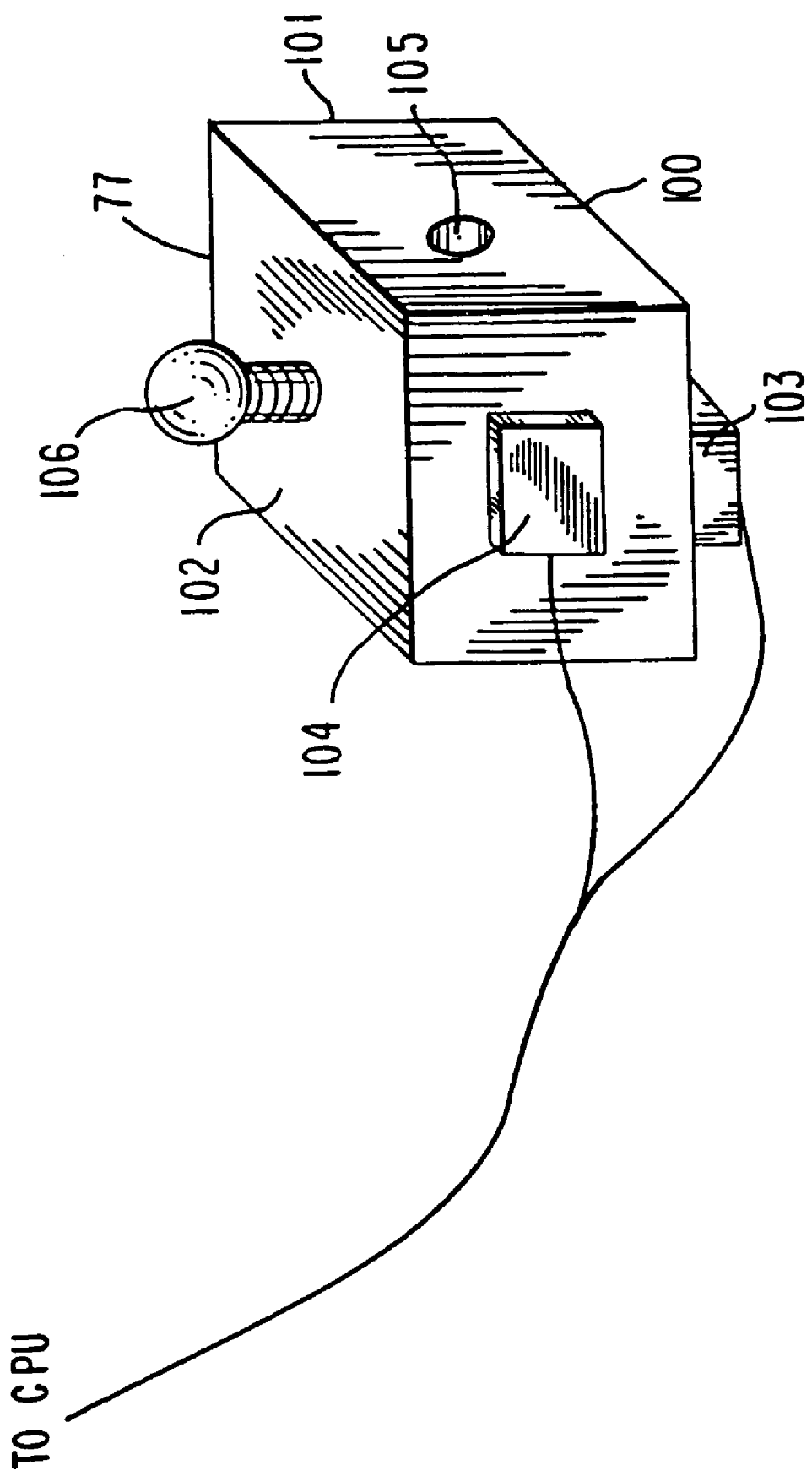
FIG. 10 is a perspective view of a tip mass and sensor assembly of the apparatus of FIGS. 6–9.

As shown in FIG. 10, tip mass and sensor assembly 77 preferably has a body 102 with a mass of between about 190 grams and about 220 grams, and preferably about 200 grams, to simulate the mass of a golf club head at the distal end of a golf club shaft. In another embodiment, different tip masses could be provided to more closely simulate different types of club heads, which have different masses. However, this latter embodiment would be more costly, insofar as each different mass would need its own set of transducers to collect displacement data, as well as different computations based on those data.

The presence of body 102 on the end of a golf club shaft when the shaft is deflected and allowed to oscillate during testing in accordance with the present invention, as described below, not only mimics the effect of a club head during a swing, but also provides "reaction mass" that prevents the shaft oscillations from damping out before sufficient data can be collected. The transducers that collect the displacement data preferably are two accelerometers 103, 104—such as Model 8303A available from Kistler Instrument Corp. of Amherst, N.Y.—aligned along two different axes. Preferably, the two axes are orthogonal to one another, but that is not necessary; as long as the angular relationship between the axes is known, the motion recorded by accelerometers 103, 104 can be resolved computationally into two orthogonal components. Also preferably, the two axes are parallel and perpendicular, respectively, to base 71. Again, however, that is not necessary.

Tip mass and sensor assembly 77 preferably has an attachment structure for attaching to the tip of a golf club shaft. Preferably, the attachment structure includes a bore 105, slightly larger in diameter than an average golf club shaft, in body 102, into which the shaft may be introduced, and a set screw 106 for tightening body 102 onto the shaft. Alternatively, some sort of quick-release clamp can be provided, particularly for use in an automated system as described below.

In addition, body 102 could be divided by a plane or other surface passing through bore 105, so that it can be assembled around a shaft instead of being slipped over the shaft tip. This is particularly useful when analyzing the shaft of a pre-existing golf club and it is desired not to remove the club head from the shaft. The two portions (not shown) of body 102 could be fastened together, after being assembled around the shaft, by any suitable clamps or other fasteners. For example, the two portions could be hinged at one edge of the dividing surface, with one or more fasteners being provided on the opposite edge.

As discussed above, there preferably is the same relationship between the orientations of sides 100, 101 of tip mass and sensor assembly 77 as there is between surfaces 930, 932 of deflector arm 93. This is so that tip mass and sensor assembly 77 can be repeatedly lined up the same way for every test, by resting sides 100, 101 against surfaces 930, 932.

Figure 11:
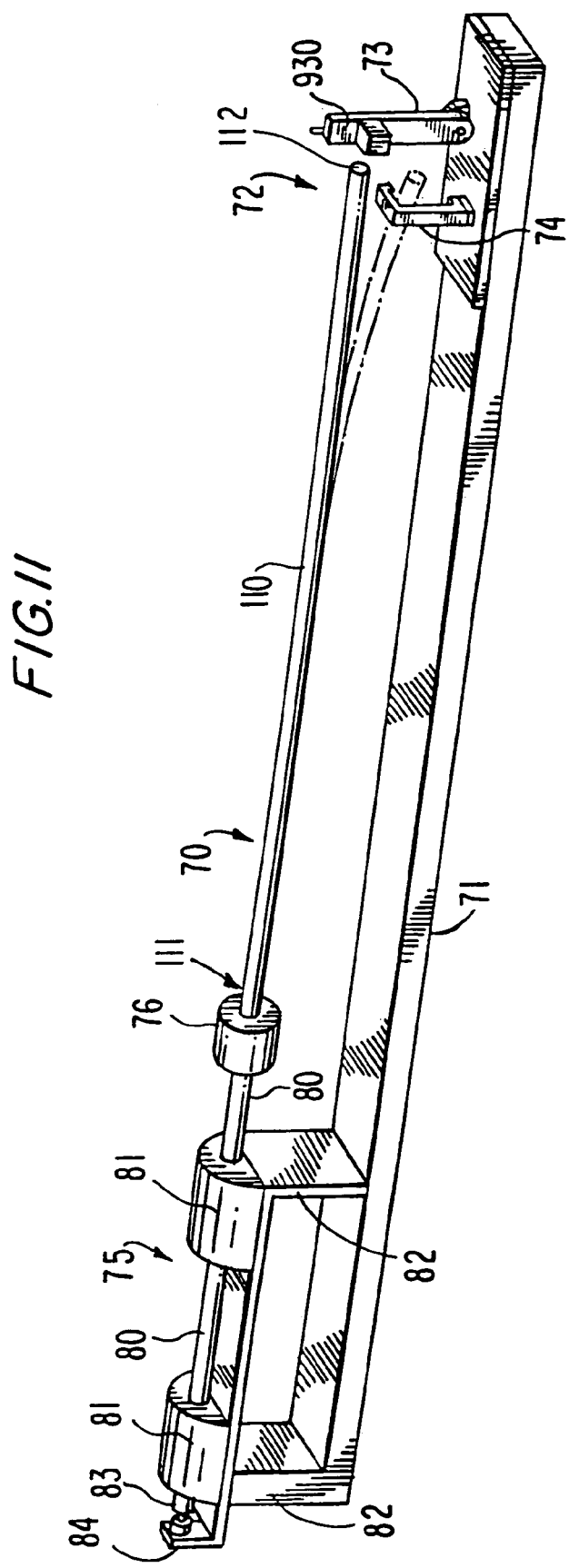
FIG. 11 is a view similar to FIG. 7 with a golf club shaft mounted in the apparatus.

In order to test a golf club shaft, the shaft 110 is mounted in chuck 76 as shown in FIG. 11. The tip, or distal end, of shaft 110 is then deflected and restrained under the lip 120 of shaft tip restraining arm 92, as shown in phantom in FIG. 11, so that the restoring force tending to straighten shaft 110 can be measured by load cell 91. Chuck 76 is then rotated—manually, or by motor 86 preferably under control of processor 61—while the restoring force is recorded by computer 61 as a function of angle, which is determined by potentiometer 84, to which a known voltage is applied. By well-known voltage divider techniques, the changing resistance is translated to a changing voltage, which can be converted to an angle.

It might be expected that when the upward restoring force is a maximum, then the point of maximum asymmetry of the shaft, representing the hard side of the principal planar oscillation plane, is facing upward. It has been found empirically, however, that that is not so, but that the hard side is within the quadrant that is facing upward when the maximum force is measured. The angle of the maximum force is therefore recorded in this static portion of the test, and the remainder of the test, which is dynamic, is conducted.

In the dynamic portion of the test, the tip or distal end of golf shaft 110 is oscillated with tip mass and sensor assembly 77 in place. While in the static portion of the test the tip preferably is deflected vertically, in the dynamic portion of the test the deflection is preferably horizontal, although any direction can be used in either portion of the test. The reason for preferring horizontal deflection in the dynamic portion of the test is that, first, the effect, on the results, of gravity acting on the tip mass is minimized, and, second, it is easier to oscillate the shaft without it hitting base 71. Therefore, before the dynamic portion of the test is initiated, chuck 76 preferably is rotated about 90°, so that the estimated orientation of the principal planar oscillation plane, which had been vertical, is now horizontal.

In the apparatus so far described, tip mass and sensor assembly 77 is applied, and a horizontal impulse is imparted, to golf club shaft 110, as follows. With the proximal or handle end 111 of golf club shaft 110 held in chuck 76, and deflector arm 93 standing erect, bore 105 in body 102 of tip mass and sensor assembly 77 is placed over distal or tip end 112 of golf club shaft 110. Tip mass and sensor assembly 77 is then manipulated until surfaces 100, 101 of body 102 are firmly seated against surfaces 930, 932 of deflector arm 93, placing accelerometers 103, 104 in their predetermined desired orientations. A portion of surface 100 not occupied by accelerometer 103 is used for this purpose, so that accelerometer 103 does not interfere with the seating of body 102. Although accelerometers 103, 104 are shown connected to processor 61 by wires 62, a wireless connection (not shown) could be provided.

Figure 12:
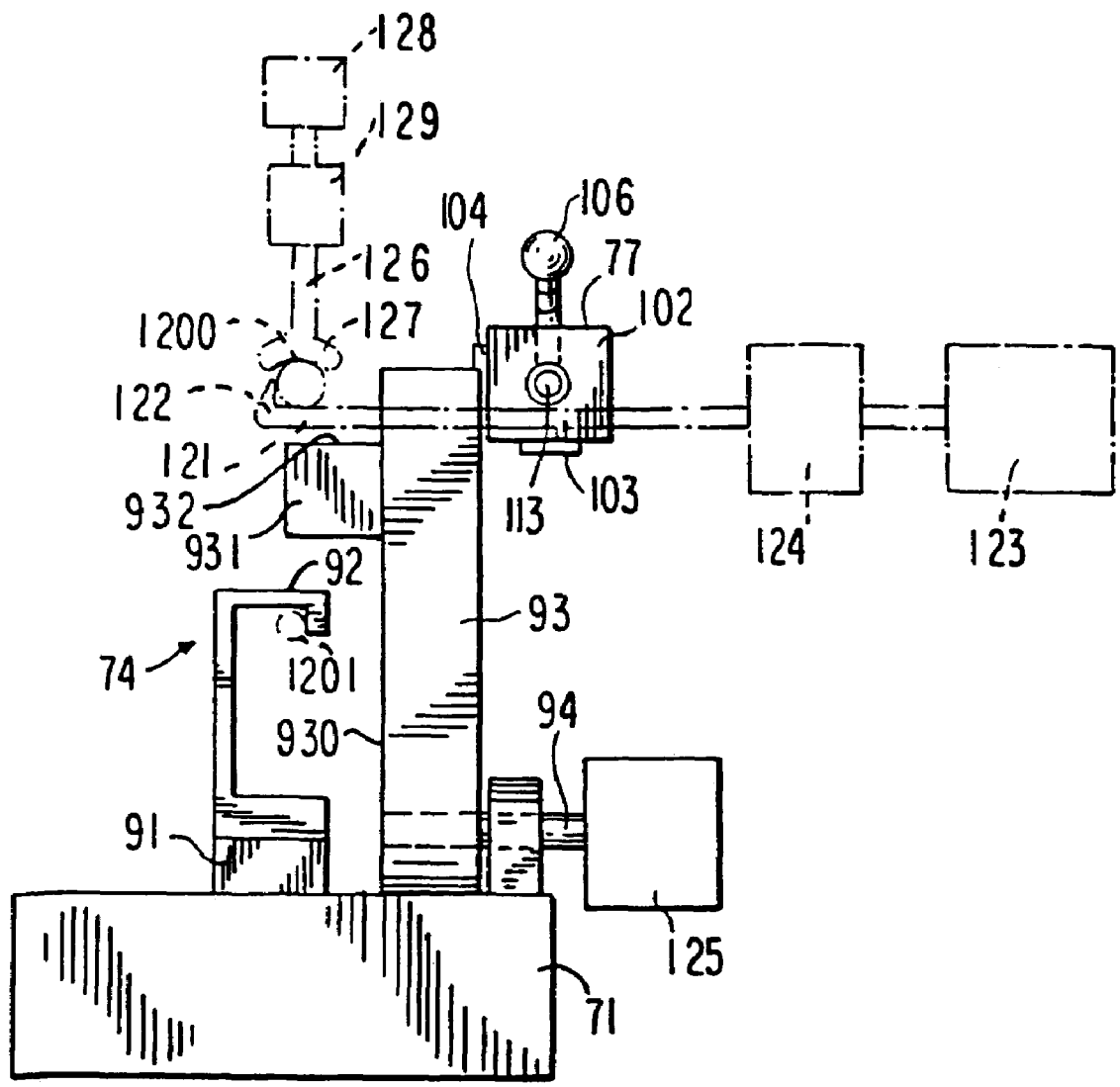
FIG. 12 is an end elevational view, taken from line 12—12 of FIG. 11, but with the golf club shaft deflected in preparation for oscillation according to the invention.

A preferably substantially horizontal impulse is provided to tip mass and sensor assembly 77 by deflecting tip 112 of golf club shaft 110 to side 120 of deflector arm 93 opposite side 930, as seen in FIG. 12, and then, preferably in a sudden motion, pivoting deflector arm 93 out of its erect position, allowing the restoring force in deflected golf club shaft 110 to provide a horizontal impulse to start tip 112 of golf club shaft 110 to begin vibrating, along with tip mass and sensor assembly 77, in the manner described above in connection with FIGS. 2–5.

Although the initial deflection of golf club shaft 110 behind deflector arm 93, as well as the pivoting of deflector arm 93 to allow tip 112 to oscillate, can be accomplished manually, they can also be accomplished automatically. Thus, an arm 121 bearing a finger 122, driven by a motor 123 through suitable gearing or linkage 124 that provides the necessary horizontal and vertical components of motion, can be used to move tip 112 of golf club shaft 110 from its neutral position 1200 to the position behind deflector arm 93. This could involve both vertical and horizontal movement of tip 110 by finger 122, or finger 122 could move solely horizontally while motor 125 pivots deflector arm 93 out of the way temporarily and then restores deflector arm 93 to the erect position. Similarly, the pivoting of deflector arm 93 to allow oscillation to begin can be performed by motor 125 instead of manually.

As a further alternative, instead of applying an impulse by deflecting shaft 110 behind deflector arm 93 and then releasing arm 93, a horizontal plunger or ram (not shown) could be used to strike tip mass and sensor assembly 77 rapidly and for a short time.

Each of accelerometers 103, 104 records acceleration in one of two respective directions, which preferably are orthogonal to one another, and preferably are horizontal and vertical, respectively. However, any two directions may be used, as long as they are known, and the horizontal and vertical components can be calculated. The accelerations may be integrated twice over time to determine horizontal and vertical displacements, but the acceleration is generally indicative of the displacement and may be used directly, saving computational resources and time that would be needed to perform the integrations. Alternatively, displacement can be measured directly, for example, by providing, instead of accelerometers 103, 104, a light source, such as a laser or light-emitting diode (not shown), on the end of tip mass and sensor assembly 77 emitting light along the direction of the longitudinal axis of golf club shaft 110. A light sensitive detector array (also not shown) could be placed substantially perpendicular to the emitted light beam, which would trace the displacement of tip 112 on the detector array, recording the displacement directly. Regardless of how the data are collected, they can be plotted as a function of time and used to derive displacement and frequency data that are then used, as described above, to mathematically determine the preferred angular orientation in which lies the principal planar oscillation plane. The direction of the principal planar oscillation plane closer to the estimated orientation determined by load cell 91 would be considered the "hard" side of the principal planar oscillation plane of golf club shaft 110, which preferably should be aligned perpendicular to, and facing, or in any other predetermined orientation with respect to, the club head face. However, the load cell test could be eliminated, insofar as aligning golf club shaft 110 with a planar oscillation plane in a desired orientation with respect to the club head face, whether the hard side of that planar oscillation plane faces toward or away from the face, may be better than having that planar oscillation plane at a random orientation relative to the club head face, and also insofar as aligning any planar oscillation plane with respect to the club head face, even if it is not the principal planar oscillation plane, may be better than a random orientation. It should be remembered, however, that if a random planar oscillation plane, rather than the principal planar oscillation plane, is found for each golf club shaft in a set, then even if the planar oscillation plane so found for each shaft is oriented similarly relative to its respective club head, the set cannot be assumed to be uniformly oriented.

Figure 13:
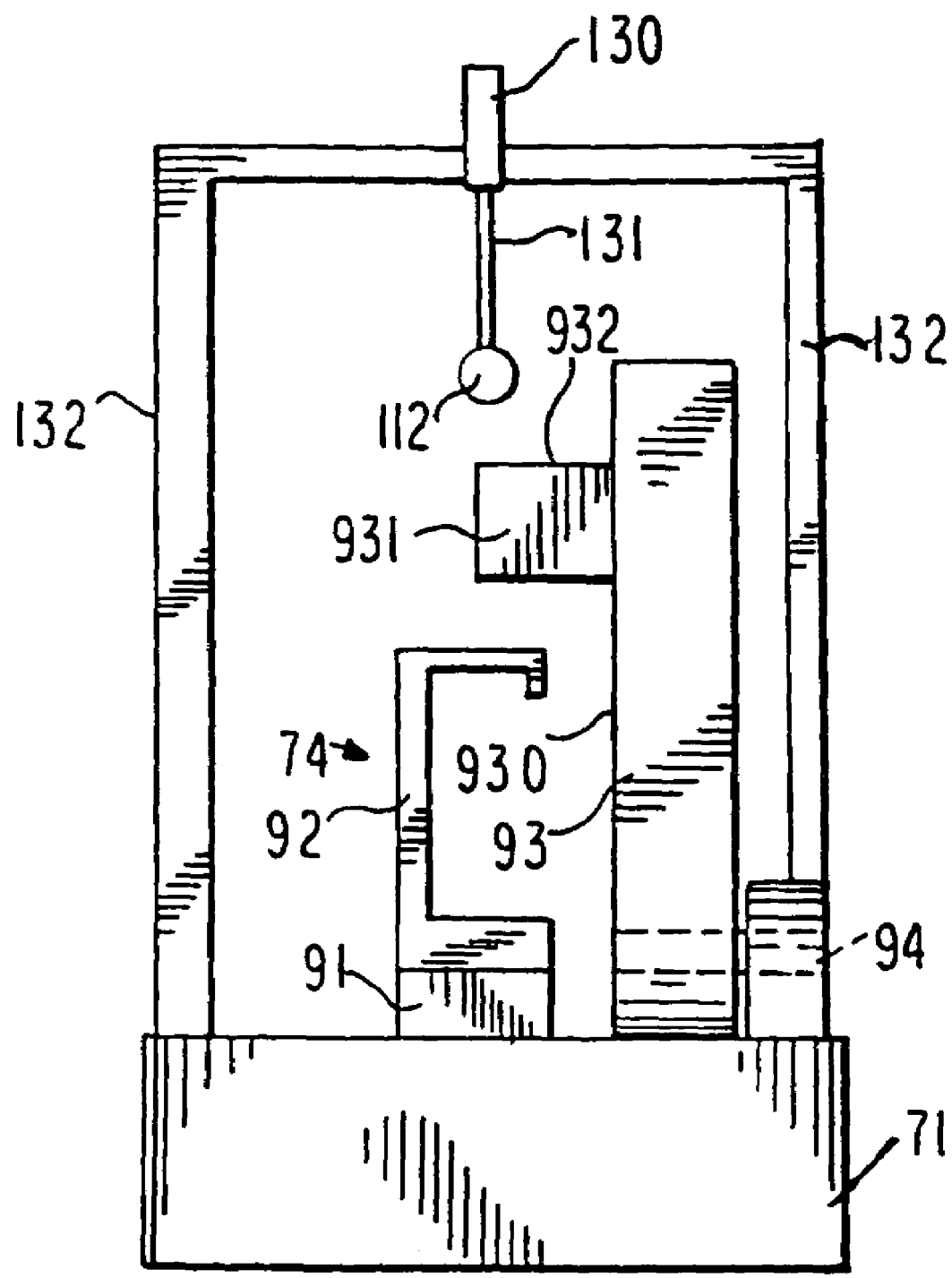
FIG. 13 is perspective view of the apparatus of FIGS. 6–10 with a marking assembly included.
Figure 14:
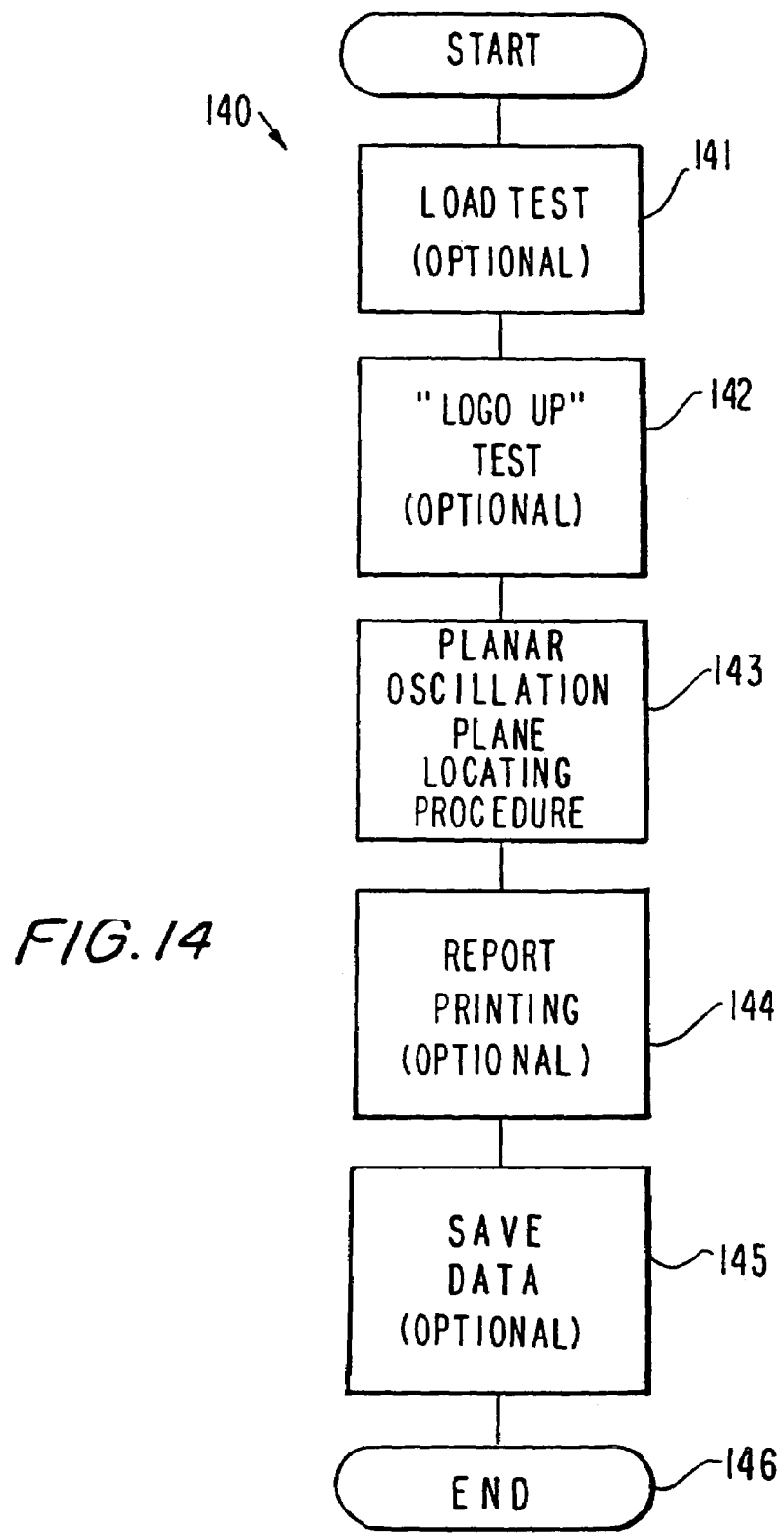
FIG. 14 is a flow diagram of a preferred embodiment of a method according to the invention for location the preferred orientation of a golf club shaft.

Once the location of the desired planar oscillation plane (preferably the principal planar oscillation plane) has been determined, shaft 110 preferably is marked to indicate the orientation of that planar oscillation plane. Marking may be accomplished by applying a pigment (e.g., paint or ink) to the surface of shaft 110. For example, an ink marker 130 having a marking tip 131 could be mounted on a frame 132 as shown in FIG. 13. After the preferred orientation has been determined, shaft 110 can be rotated so that the preferred orientation is aligned with marking tip 131, which then applies a mark to shaft 110. Alternatively, 130 could represent a paint reservoir, while 131 would represent a paintbrush or a jet of sprayed paint. As a further alternative, marking of shaft 110 could be accomplished using a directed energy beam or a particle beam to etch a marking into the surface of shaft 110. In such an alternative, 130 could represent a high-energy laser, while 131 would represent the laser beam, or 130 could represent an electron gun while 131 would represent the electron beam. Optionally, either shaft 110 or the marking assembly could be moved parallel to the shaft longitudinal axis during marking so that the marking on the shaft is a line instead of a dot, to increase its visibility. Alternatively, as discussed above, a marked label, such as a sticker or decal, bearing alignment markings, can be applied to shaft 110.

The preferred method 140 according to the invention for locating the preferred orientation (i.e., either any planar oscillation plane or the principal planar oscillation plane), using apparatus 60, is diagramed in FIGS. 14–17. Method 140 preferably starts with load test 141, described above, which uses load cell 91 to estimate the orientation of the principal planar oscillation plane and which at least identifies which of the two sides of the principal planar oscillation plane is the "hard" side of the planar oscillation plane, by measuring the restoring force as a function of angle of a deflected shaft that is rotated through at least 360°. Load test 141 could be omitted, but only if one is prepared to find any planar oscillation plane, rather than the principal planar oscillation plane in particular (unless another technique is used to identify the principal planar oscillation plane). Where load test 141 is performed, the result is used as a starting point for planar oscillation plane location step 143, below. Alternatively, load test 141 could be performed on a stand-alone basis to measure the symmetry of a shaft.

After load test 141 is performed, optional "logo up" test 142 is performed, to gather data, for comparison purposes, regarding the oscillation of a golf club shaft in its factory installed orientation. Conventional golf clubs are typically assembled with the manufacturer's logo, which is printed on the shaft, facing toward the club head face, in what is referred to as a "logo up" configuration. Some manufacturers align the logo 180° away from the club head face in a "logo down" configuration, or in other configurations. During "logo up" test 142, the shaft is positioned in its original factory installed position, but test 142 is referred to as the "logo up" test because most frequently the factory position has the logo facing upward. In any case, because the logo is printed at a random location on the shaft circumference—i.e., without the benefit of knowing the location of any planar oscillation plane—the factory alignment is purely random regardless of the actual logo position.

As described above, planar oscillation plane location procedure 143 is performed next. After procedure 143 has been performed, an optional report printing step 144, in which some or all of various parameters regarding the golf shaft whose preferred orientation has been found are printed. Finally, in an optional save step 145, various of the data acquired during steps 141–144 are saved (e.g., in mass storage 64).

Load test 141 is shown in more detail in FIG. 15. At step 150, a golf club shaft 110, which may have been removed from a golf club, is placed in chuck 76 at an arbitrary starting angle. Tip 112 of golf club shaft 110 is deflected and restrained under shaft tip restraining arm 92 so that the restoring force in the deflected shaft 110 is measured by load cell 91. The shaft can be deflected and secured manually, or the deflection and securing can be accomplished automatically. Thus, an arm 126 bearing a finger 127, driven by a motor 128, through suitable gearing or linkage 129 that provides the necessary horizontal and vertical components of motion, can be used to move tip 112 of golf club shaft 110 from its neutral position 1200 to position 1201 under shaft tip retention arm 92.

Once tip 112 is under shaft tip retention arm 92, then in step 151 chuck 76 preferably is rotated about 200° in one direction (which may be designated the negative rotation direction). Next, at step 152, chuck 76 is rotated at least 360° in the opposite direction (which may be designated the positive rotation direction) while data is acquired from load cell 91 and recorded as a function of angle. Preferably, in step 152, chuck 76 is rotated about 400° and 40° (preferably the first and last 20°) is discarded. Alternatively, however, the reverse rotation of step 151 may be omitted, as long as data are recorded through at least 360°, and if data are recorded through more than 360°, then any amount of rotation greater than 360° may be used and any portion—all at the beginning, all at the end, or any combination of beginning and end—may be discarded to provide 360° worth of data.

At step 153, the data gathered in step 152 are examined, and the angle A corresponding to the maximum load measured by load cell 91 is determined. If desired, the load as a function of angle may be graphed for display. Next, at step 154, the start angle S, for use in planar oscillation plane location test 143, is set to A-90°. This takes into account the change of orientation from vertical to horizontal as between the load test 141 and the planar oscillation plane location test 143, as described above.

Figure 16:
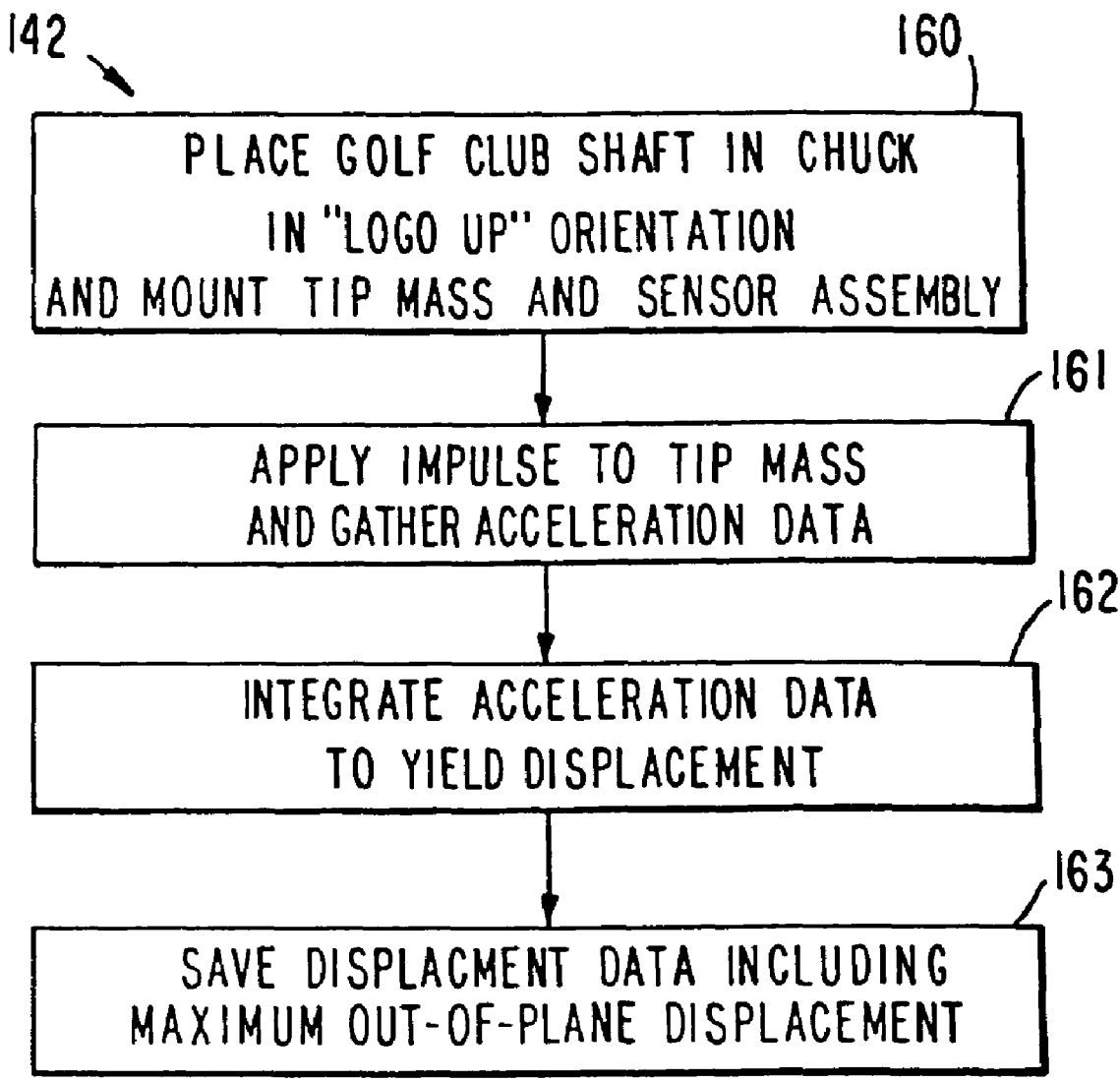
FIG. 16 is a flow diagram of a "logo up" comparison test performed according to the invention as part of the method of FIG. 14.

After the conclusion of load test 141, "logo up" test 142, shown in detail in FIG. 16, may be conducted. The purpose of "logo up" test is primarily to provide a "before" comparison to the "after" result to be obtained after performing planar oscillation plane location test 143. Therefore, as stated above, "logo up" test 142 is optional. In particular, while "logo up" test 142 may be used primarily as a promotional tool in an aftermarket situation—i.e., by a golf club retrofitter—to show the improvement obtained by realigning the shaft of a golf club in accordance with the invention, it probably would not be used by a golf club manufacturer who produces "spine-aligned" golf clubs, because there is no need to show comparative data.

"Logo up" test 142 begins at step 160 where golf club shaft 110, which, again, may have been removed from a golf club, is placed in chuck 76. If it had previously been part of a completed golf club, shaft 110 is placed in chuck 76 in the same orientation in which it was oriented in the golf club, as the club would have been positioned by a golfer adjacent a ball before the start of the golfer's swing. In most cases, this would be with the manufacturer's logo facing up, but sometimes the logo faces down or in a random direction. If test 142 is being performed on a golf club shaft that has never been part of a golf club, then preferably it is tested with its logo up, or with the logo in whatever position, whether or not it is up, is recommended by the shaft manufacturer for alignment of the logo when assembling a golf club. Tip mass and sensor assembly 77 is then mounted on tip 112 of shaft 110.

Next, at step 161, an impulse is applied to tip mass and sensor assembly 77 in one of the ways described above and orthogonal—preferably, horizontal and vertical—acceleration data are gathered, preferably for about 4 seconds. These data preferably are integrated at step 162 to yield orthogonal—preferably horizontal and vertical—displacement data as functions of time, which preferably are saved at step 163 for later comparison with the results after alignment of shaft 110, and the data preferably also are graphed at step 163 for display to the owner of the golf club of which shaft 110 is a part. The maximum out-of-plane displacement—i.e., preferably the maximum vertical displacement—preferably is also saved at step 163 for display to the owner. Test 142 is now complete.

Figure 17:
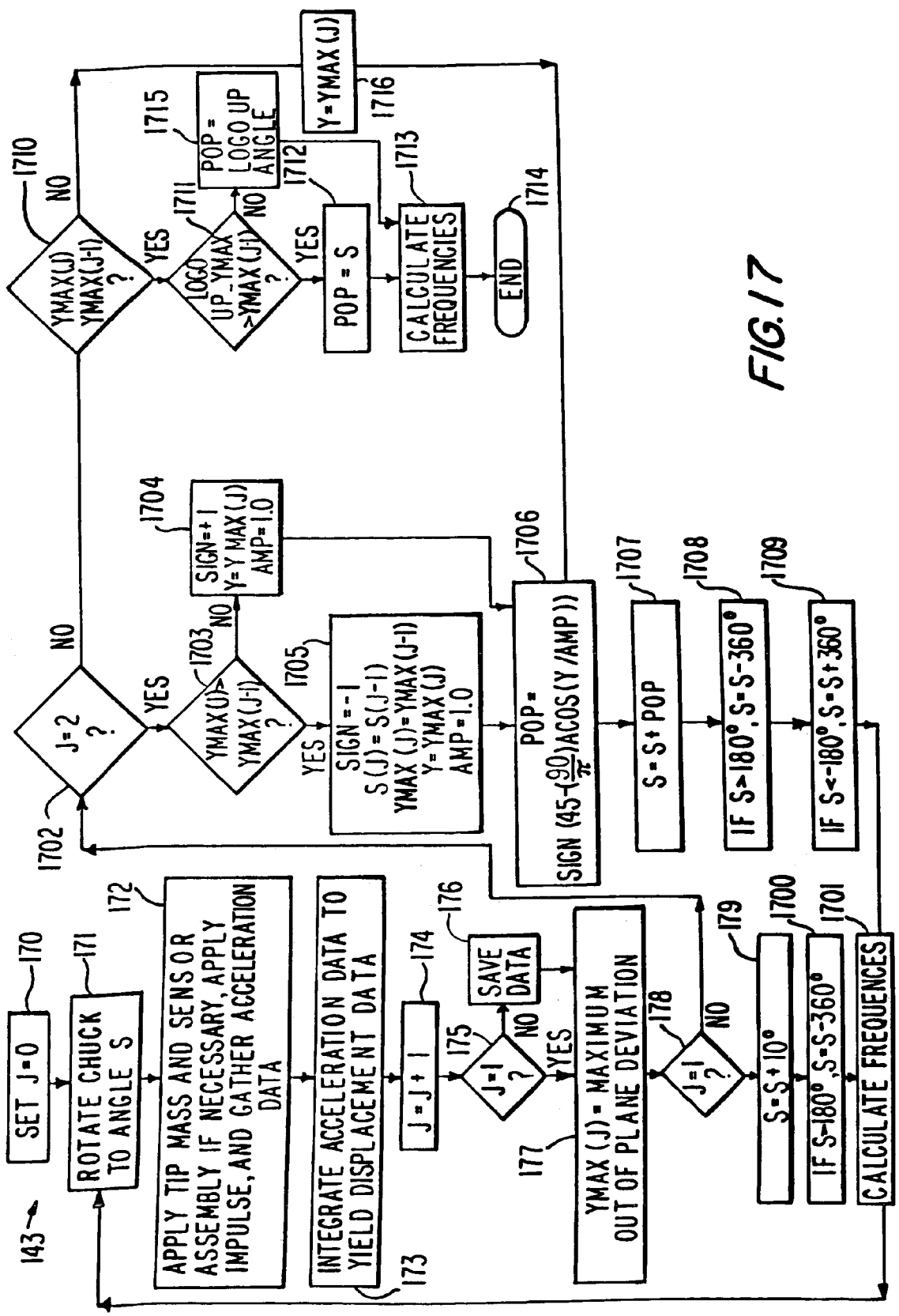
FIG. 17 is a flow diagram of a planar oscillation plane locating test performed according to the invention as part of the method of FIG. 14.

The system next proceeds to planar oscillation plane location test 143. As shown in FIG. 17, test 143 starts at step 170 where a counter J is initialized to zero. Next, at step 171, chuck 76, still holding shaft 110, is rotated to the start angle S previously computed. If no start angle S has been computed, test 143 starts at an arbitrary angle.

At step 172, if tip mass and sensor assembly 77 has not previously been attached to tip 112 it is attached, and in any case an impulse is applied to tip mass and sensor assembly 77 in one of the ways described above and orthogonal—preferably, horizontal and vertical—acceleration data are gathered, preferably for about 4 seconds. These data preferably are integrated at step 173 to yield orthogonal—preferably horizontal and vertical—displacement data as functions of time. At step 174, the counter J is incremented by one. At test 175, the system tests to see if J=1. If, as on this first pass, J=1, then the system skips directly to step 177.

At step 177, the system sets a variable YMAX(J) equal to the maximum out of plane deviation value from step 173. The system then proceeds to test 178 where it determines if J=1, meaning it is the first pass through the loop. There preferably are always at least three passes through the loop. If at test 178 J=1, then at step 179 the angle S is incremented by 10°. At step 1700, in order to keep S between +180° and −180°, if S>180°, then S is set to S−360°. Next, at step 1701, the frequencies of the horizontal and vertical oscillations are determined; this may be done from the displacement-vs.-time data from step 173. Frequency data are commonly used to measure the stiffness of golf club shafts, and these data are useful for comparison. Note, however, that the frequency of shaft oscillation is dependent on the length of shaft protruding from whatever holding device is used and on the characteristics of the holding device (e.g., the length and tightness). Therefore, if any comparison is to be made, care should be taken to use the same holding device and to assure that the same length of shaft is free to vibrate.

After step 1701, the system loops back to step 172, and steps 172–174 are carried out again. This time, at test 175 J≠1, and at step 176 the data from step 173 are saved along with angle S, and the system proceeds to step 177. Again at step 177 variable YMAX(J) is set equal to the maximum out of plane deviation value from step 173. This time at test 178 J≠1, and the system proceed to test 1702 to determine if J=2.

On this second pass, J=2 and the system proceeds to test 1703 to determine if YMAX(J)>YMAX(J−1). If not, that means in this iteration the out-of-plane excursions are smaller, meaning the angle S is closer to the preferred orientation—i.e., to the planar oscillation plane—and at step 1704 the variable SIGN is set to +1, the variable Y is set to the value of YMAX(J), and the variable AMP is set to 1.0, and the system proceeds to step 1706. If at test 1703 YMAX(J)>YMAX(J−1), that means in this iteration the out-of-plane excursions are larger, meaning the angle S is further from the planar oscillation plane, and at step 1705 the variable SIGN is set to −1, the variable S(J) is set to the value of S(J−1), the variable YMAX(J) is set to the value of the variable YMAX(J−1) and the variable Y is then set to the value of YMAX(J), and the variable AMP is again set to 1.0, and the system proceeds to step 1706. Note that in either step 1704 or step 1705, AMP can be set to a lower value to cause the result to converge sooner, but with lower accuracy, while setting AMP higher increases accuracy but increases the number of iterations before convergence. This is a trade-off between speed and accuracy.

At step 1706 the system calculates the variable POP=SIGN(45−(90/π)cos$^{-1}$(Y/AMP)), and at step 1707 the value of S is set to S+POP. At step 1708, in order to keep S between +180° and −180°, if S>180°, then S is set to S−360°. Similarly, at step 1709, in order to keep S between +180° and −180°, if S<−180°, then S is set to S+360°. The system then returns to step 1701 to calculate the frequencies, and once again loops back to step 172. This time, on the third pass, at test 178 J≠1, and at test 1702 J≠2, and the system advances to test 1710 to determine if YMAX(J)>YMAX (J−1). If it is, then the values are converging, and the system proceeds to test 1711 to determine if the out-of-plane excursion on the last iteration (YMAX(J−1)) is less than the maximum out-of-plane excursion during the "logo up" test 142. If it is, then the current orientation is the preferred orientation, and at step 1712 the variable POP, representing the preferred orientation, is set to the value of the variable S, representing the current orientation. At step 1713, the shaft frequencies are again calculated as in step 1701, and test 143 ends at 1714.

If at test 1711, the out-of-plane excursion on the last iteration (YMAX(J−1)) is not less than the maximum out-of-plane excursion during the "logo up" test 142, then at step 1715, the variable POP, representing the preferred orientation, is set to the "logo up" angle. At step 1713, the shaft frequencies are again calculated as in step 1701, and test 143 ends at 1714.

If at test 1710, YMAX(J) ≯ YMAX(J−1), then the values have not converged, then at step 1716, Y is set to the value of YMAX(J). The system then recalculates POP at step 1706 and from there goes through the loop at least one more time.

If optional "logo up" test 142 is not performed, then if test 1710 indicates convergence, test 1711 is not performed and the system proceeds directly from test 1710 to step 1712.

After completing planar oscillation plane location test 143, the system proceeds to report printing step 144 where the values of the following data preferably are printed (and determined if necessary): load as a function of angle (as determined in load test 141); load symmetry index (LSI), which is a measure of the variability in stiffness of the shaft (LSI=100(1−((P$_{max}$−P$_{min}$)/P$_{max}$)), where P$_{max}$ and P$_{min}$ are the maximum and minimum loads, respectively, measured in step 152); displacement plot at the "logo up" angle; displacement plot at the POP angle; displacement as a function of time at the "logo up" angle and the "hard" and "soft" POP angles (the latter two should be exactly 180° apart); the horizontal and vertical frequencies and the maximum out-of-plane excursions at the "logo up" and POP angles; and a frequency index equal to the ratio of the horizontal frequency at the POP angle to the horizontal frequency at the "logo up" angle, which is a comparative measure, in the form of a percentage improvement, of stiffness in the hit direction as between the original "logo up" configuration of the golf club and the aligned configuration.

Next at step 145 the data are saved. In a full save, all data are saved. There preferably is also a "quick save" in which all the data printed in step 144 are saved except for the complete load-vs.-angle data and the complete displacement data at the "logo up" and POP angles. Following saving step 145, process 140 ends at 146.

An alternative embodiment of apparatus 1870 for determining the principal planar oscillation plane of a golf club shaft, and an associated method, are now described in connection with FIGS. 18–22.

Apparatus 1870 is substantially fully automated. Substantially the only steps performed manually in using apparatus 1870 are the adjustment of the location of instrumentation table 1872 to conform to the length of the golf club shaft 110 being measured, the mounting of shaft 110 in chuck 1876, and the mounting of tip mass and sensor assembly 1877 on shaft 110.

Shaft testing assembly 1870 preferably includes an elongated base 1871, which is at least as long as the longest golf club shaft expected to be tested. At one end of base 1871 is a measurement instrumentation table 1872, which can be translated along base 1871 to accommodate golf club shafts of different lengths. Preferably, instrumentation table 1872 has a base 1890 with downward projections (not shown) that ride in slot 1891 in base 1871, as well as a roller 1892 that rides on supporting surface 1800 of enclosure 1801. Screw 1874 preferably is provided to lock instrumentation table 1872 in a selected position.

Instrumentation table 1872 includes deflector/deflection load sensor assembly 1878, used to determine straightness. Instrumentation table 1872 also includes vibration initiator assembly 1873, used to initiate vibration of shaft 110 for determination of stiffness and to locate the planar oscillation plane of shaft 110, and vibration dampener assembly 1897 whose function is explained below.

At the other end of base 1871 is a shaft holding and rotating assembly 1875, including a rotatable chuck 1876 for holding a golf club shaft 110.

Figure 18:
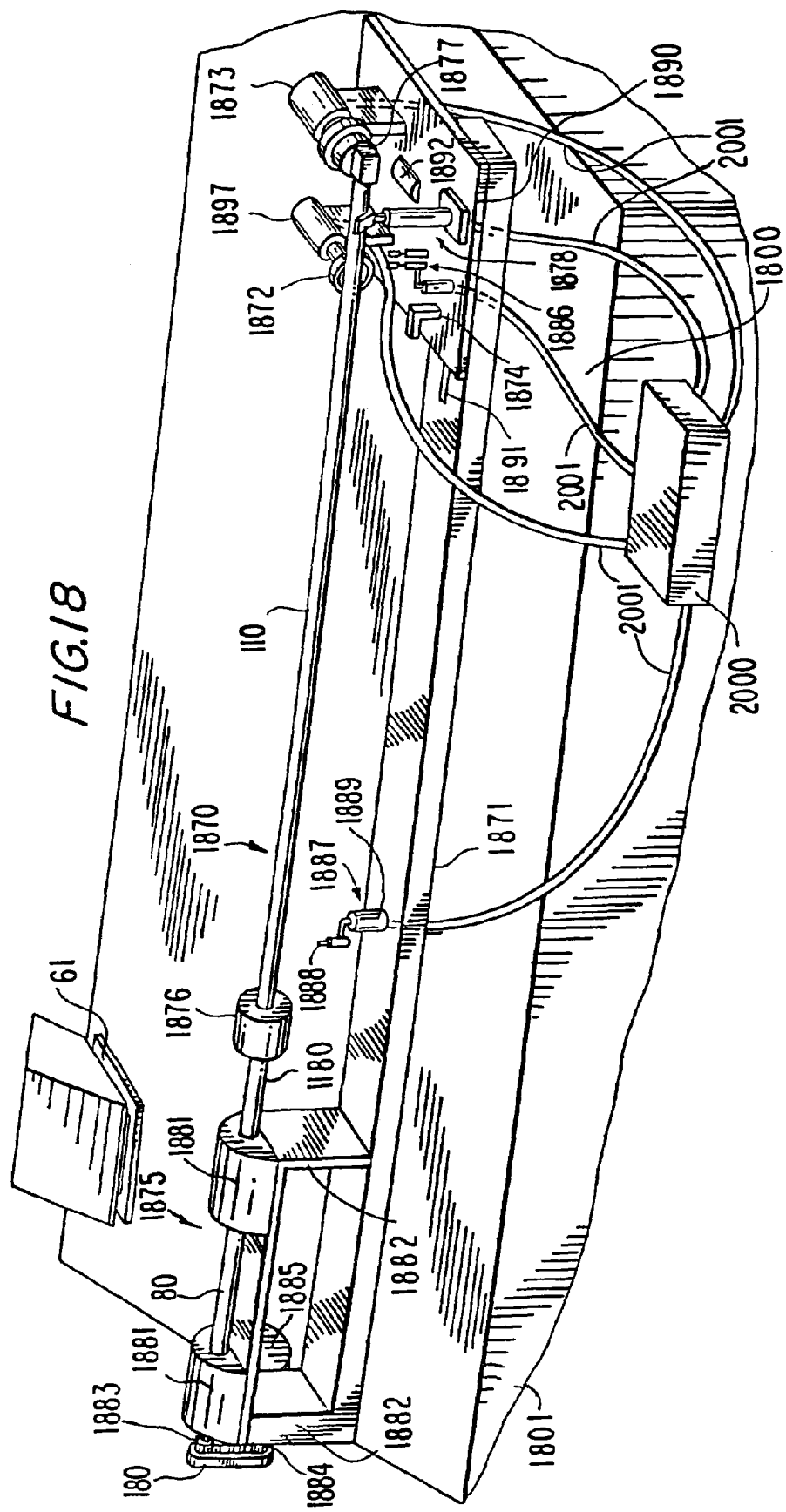
FIG. 18 is a perspective view of a second preferred embodiment of apparatus according to the present invention for determining the preferred orientation of a golf club shaft.

As seen in FIG. 18, shaft holding and rotating assembly 1875 preferably includes rotatable chuck 1876 which preferably may be conventional, preferably holding a golf club shaft by exerting radially inward force substantially evenly around the shaft circumference. Chuck 1876 preferably is mounted at the end of axle 1880, which preferably is journalled in bearings 1881. Bearings 1881 preferably are mounted on supports 1882 so that the axis of rotation of axle 1880, and by extension that of chuck 1876 and the golf club shaft being tested, is at a predetermined height above base 1871. Mounted at the end of axle 1880 remote from chuck 1876 preferably is a toothed pulley 1883, connected by a toothed belt 180 to a similar toothed pulley 1884 of servo motor 1885 whose angular position can be controlled with precision by processor 61, such as a Model SM2315 smart motor available from Animatics Corporation, of Santa Clara, Calif. Motor 1885 is preferably mounted under supports 1882. Preferably, the space under supports 1882 is also used (not shown) as a junction box for the various sensors and other electrical and electronic components described below. Also preferably, the space under supports 1882 is enclosed, as by acrylic panels (not shown), to keep out dust and dirt and to prevent users from coming into contact with any exposed electrical connections.

Figure 19:
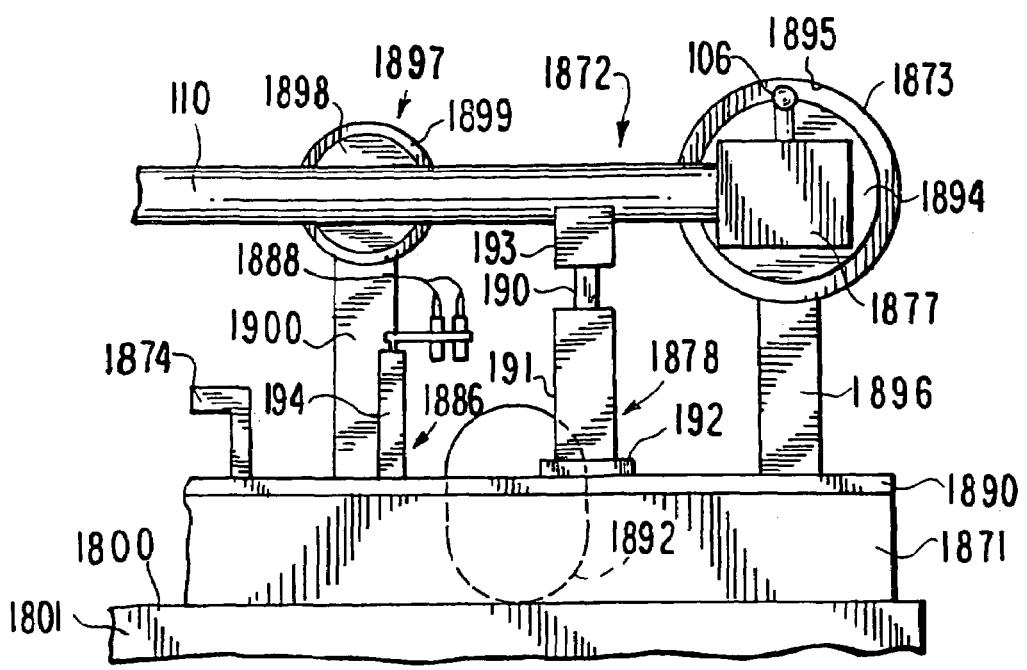
FIG. 19 is a side elevational view of a measurement assembly of the apparatus of FIG. 18.
Figure 20:
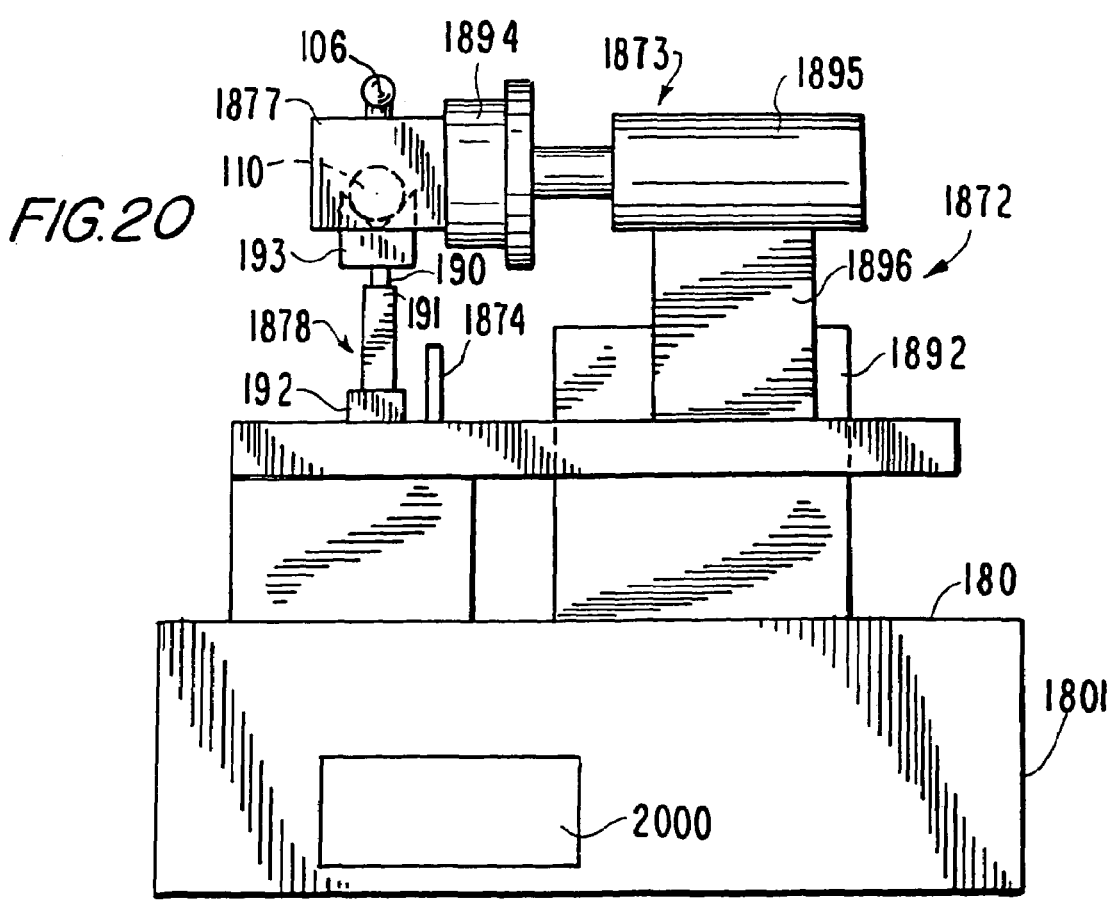
FIG. 20 is an end elevational view of the measurement assembly of FIG. 19.

Instrumentation table 1872 is shown in more detail in FIGS. 19 and 20. Deflector/deflection load sensor assembly 1878 includes a vertically extending bar 190 mounted so that golf club shaft 110 passes above, but spaced from, its upper end. Bar 190 can be moved vertically, and preferably an actuator such as pneumatic cylinder 191 is provided to move bar 190 upwards to that its upper end engages shaft 110 and deflects shaft 110 upward by a predetermined amount. Any other suitable actuator can be used, including a linear actuator such as a solenoid or hydraulic cylinder, or rotary actuator such as a motor. Preferably, the upper end of bar 190 is provided with a seat, such as a V-shaped seat 193, to engage shaft 110. A compressive load sensor 192 such as Model 9222 from Kistler Instrument Corp., of Amherst, N.Y., is provided beneath cylinder 191 to measure the restoring force exerted by shaft 110 when it is deflected upward by bar 190. As discussed above in connection with the previous embodiment, because the load test measurements are taken vertically while the planar oscillation plane location measurements are taken horizontally, load test data are recorded at angles offset 90° from the angles at which they are measured.

Vibration initiator assembly 1873 of instrumentation table 1872 preferably includes electromagnet 1894 preferably mounted for horizontal movement transverse to the longitudinal axis of shaft 110, preferably under the influence of pneumatic cylinder 1895 mounted on support 1896. Any other suitable actuator can be used, including a linear actuator such as a solenoid or hydraulic cylinder, or a rotary actuator such as a motor.

Apparatus 1870 preferably also includes proximal end shaft marking mechanism 1887 and distal end shaft marking mechanism 1886 for marking on golf club shaft 110 the location of the principal planar oscillation plane once determined. Distal end shaft marking mechanism 1886 preferably includes one or more (e.g., two, as shown) pens 1888 to make one or more (e.g., two) marks at the distal end of shaft 110 which can be used to align shaft 110 with a golf club head in the desired orientation, while proximal end shaft marking mechanism 1886 preferably includes one or more pens 1888 to make one or more marks at the proximal end of shaft 110. In both shaft marking mechanisms, a respective pneumatic cylinder preferably is used to raise pens 1888 into contact with shaft 110. Preferably, to steady shaft 110 for the marking process, shaft deflector bar 190 is raised by cylinder or other actuator 191 to deflect shaft 110 vertically and, more important, to hold it from moving horizontally during the marking process. Another cylinder or other actuator 194 then actuates pens 1888 of distal end shaft marking mechanism 1886. Cylinder or other actuator 1889 of proximal end shaft marking mechanism 1887 is also actuated so that pen 1888 at the proximal end mark shaft 110, preferably while bar 190 continues to deflect and hold shaft 110. Alternatively, as discussed above, one or more stickers or decals, bearing alignment markings, may be applied to shaft 110. The marks made on shaft 110 are made primarily to align shaft 110 with the golf club head, and therefore the number and location of the marks is a matter of choice, based on the needs of the equipment used to attach the head to shaft 110, or the needs of an individual attaching the head to shaft 110 manually.

Tip mass and sensor assembly 1877 is similar to assembly 77 above. To start the process, the user mounts tip mass and sensor assembly 1877, using the face of electromagnet 1894 as an alignment surface after golf club shaft 110 is inserted into chuck 1876. Cylinder or other actuator 1895 is set so that in its rest position, it presents electromagnet 1894 in the correct position to be used as an alignment surface for the mounting of tip mass and sensor assembly on shaft 110 with shaft 110 in its neutral position. After tip mass and sensor assembly 1877 has been mounted and aligned, electromagnet 1894 is energized. Cylinder or other actuator 1895 is then actuated to withdraw electromagnet 1894 in a direction away from the longitudinal axis of shaft 110 to deflect shaft 110 horizontally. At or before the end of the travel of electromagnet 1894 in the withdrawal direction, electromagnet 1894 is de-energized, releasing its hold on assembly 1877, causing shaft 110 to oscillate substantially horizontally.

As shaft 110 oscillates, the motion of the shaft tip as sensed by tip mass and sensor assembly 1877 is recorded by processor 61, and in particular the maximum out-of-plane vertical acceleration or displacement and the vibration frequency are noted.

Preferably, after enough data have been gathered, a dampener 1898, such as a foam pad, is moved into engagement with shaft 110, preferably by cylinder 1899 mounted on support 1900, to stop the shaft oscillation.

Whether or not dampener assembly 1897 is provided, electromagnet 1894 is next re-engaged with assembly 1877. While servo motor 1885 rotates shaft 110 to the next angular position, which preferably is 10° from the current position, engagement with the face of electromagnet 1894 keeps assembly 1877 aligned during shaft rotation. Set screw 106 preferably has a nylon tip so that if assembly 1877 is being held from rotating by electromagnet 1894, shaft 110 can nevertheless rotate relative to assembly 1877. Electromagnet 1894 is or remains energized and is again withdrawn to deflect shaft 110 which again preferably is released to vibrate by de-energizing electromagnet 1894. At this new angular position, the displacement data, including the maximum out-of-plane excursion of the shaft tip, and the frequency data are again recorded. This is repeated at preferably uniform angular intervals, preferably each 10°, so that out-of-plane excursion data and frequency data are available for thirty-six angular positions. Although the angular intervals are preferably uniform, the time spent at each angular position may not be equal. For example, in a preferred embodiment, more data may be taken at the "logo up" position and at the principal planar oscillation plane position to provide more detail for graphical display (see below).

Figure 26:
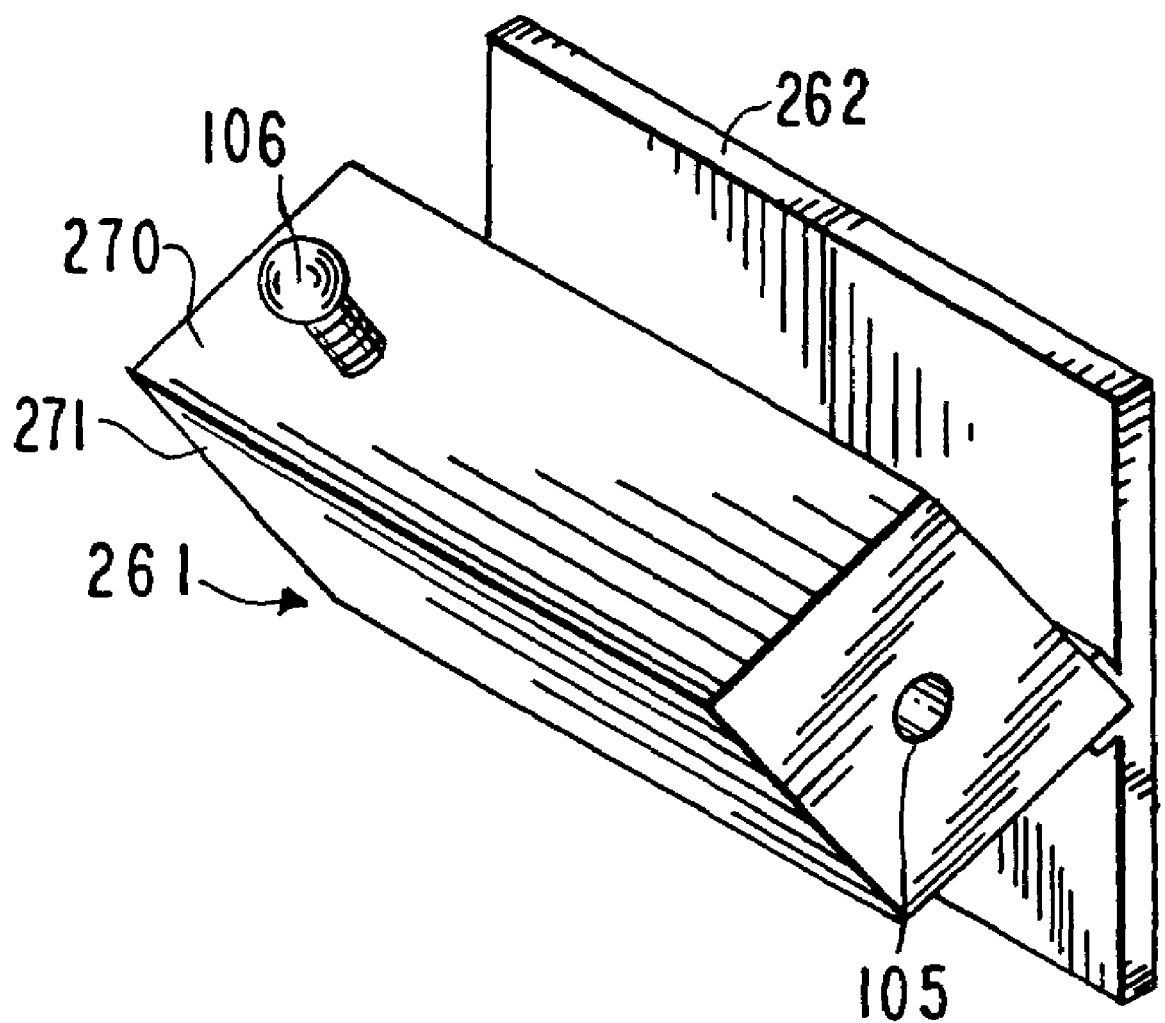
FIG. 26 is a perspective view of an alternative preferred embodiment of a tip mass assembly according to the invention.

As an alternative to tip mass and sensor assembly 1877, a tip mass assembly 261, shown in FIG. 26, may be used. Tip mass assembly 261 is similar in size and mass to tip mass and sensor assembly 1877, except that it does not include accelerometers or any other sensors, eliminating the need for a wired or wireless connection to processor 61. Tip mass assembly 261 includes a flat plate 262 for interaction with electromagnet 1894. For reasons discussed below, plate 262 is preferably mounted at an angle of 45° relative to the faces of tip mass assembly 261.

Figure 27:
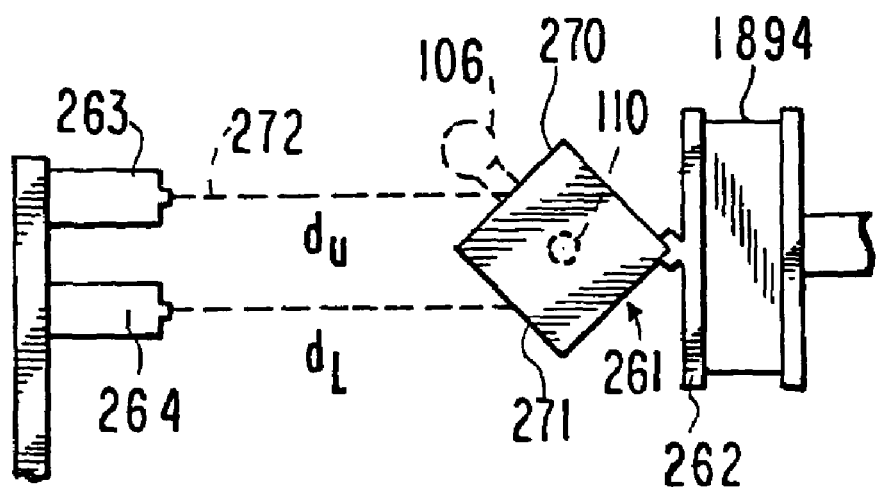
FIG. 27 is a schematic elevational view of the tip mass assembly of FIG. 26 mounted on the tip of a golf club shaft in the rest position in apparatus according to the invention.
Figure 28:
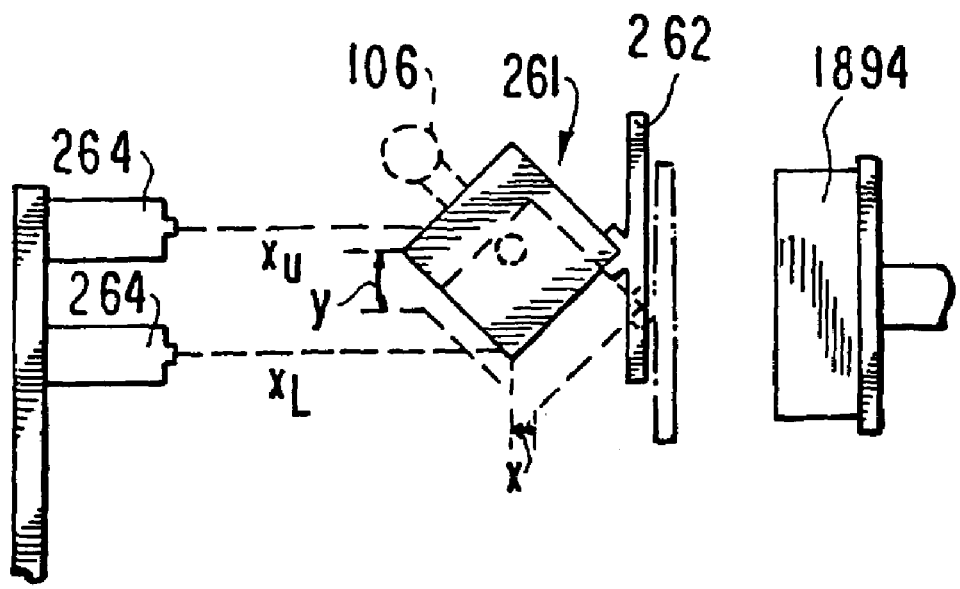
FIG. 28 is a schematic elevational view, similar to FIG. 27, of the tip mass assembly of FIG. 26 mounted on the tip of a golf club shaft in a displaced position in apparatus according to the invention.

For use in conjunction with tip mass assembly 261, apparatus 1870 preferably is equipped with a pair of laser distance sensors 263, 264, each of which may be a Type OADM laser distance sensor which is available from Baumer Electric AG, of Frauenfeld, Switzerland. As shown in FIGS. 27 and 28, sensors 263, 264 preferably are mounted so that when tip mass assembly 261 is mounted on a shaft 110, sensors 263, 264 are on the opposite side of tip mass assembly 261 from electromagnet 1894. More preferably, upper sensor 263 is mounted at a height such that its beam impacts substantially at the center of side 270, while lower sensor 264 is mounted at a height such that its beam impacts substantially at the center of side 271, when tip mass assembly 261 is mounted with plate 262 substantially vertical. It should be noted that set screw 106 is shown in phantom in FIGS. 27 and 28 because while it is located in side 270, it is further down side 270 along the longitudinal axis of shaft 110 than is the point at which the beam 272 from sensor 263 intersects side 270. Therefore, set screw 106 does not interfere with the operation of sensor 263.

Each of sensors 263, 264 includes a laser source and a photodetector and operates by measuring the time it takes for a laser pulse to reach a surface of tip mass assembly 261 and return to the photodetector. As is apparent from FIG. 27, if tip mass assembly vibrates purely horizontally, the distance $d_U$ from upper sensor 263 to side 270 will always be substantially equal to the distance $d_L$ from lower sensor 264 to side 271. However, as can be seen from FIG. 28, if there is any vertical component in the vibration of tip mass assembly 261, then, even if there is no horizontal component of vibration, the two distances $d_U$ and $d_L$ will differ.

Assuming:

(1) the horizontal and vertical displacements of tip of shaft 110 are denoted x and y, respectively;

(2) the difference between $d_U$ as measured when tip mass assembly 261 is at rest and $d_U$ as measured during a particular measurement is denoted $x_U$; and (3) the difference between $d_L$ as measured when tip mass assembly 261 is at rest and $d_L$ as measured during a particular measurement is denoted $x_L$;

then x and y can be derived from $x_U$ and $x_L$ as follows:

$$x=(x_L+x_U)/2$$

$$y=(x_L-x_U)/2$$

It will be apparent from the geometry that tip mass assembly 261 could be mounted so that sides 270 and 271 are not at 45° angles relative to vertical (or relative to the horizontal vibration plane), but rather at some other angles oblique to the vertical (or to that plane), but then the mathematics for deriving x and y from $x_L$ and $x_U$ would be significantly more complicated. It will also be apparent that it is not necessary for detectors 263, 264 to be mounted opposite the respective midpoints of sides 270, 271, as long as the beam of detector 263 will intersect side 270 and the beam of detector 264 will intersect side 271 as tip mass assembly 261 vibrates. However, if other mounting positions of sensors 263, 264 are used, care should be taken that the positions chosen are not ones such that the aforementioned condition could be violated by a degree of vibration within the expected range of vibration of tip mass assembly 261.

It will also be appreciated that sides 270, 271 of tip mass assembly 261 should not be perfectly reflective. If sides 270, 271 were perfectly reflective, all of the laser energy emitted by the laser sources in sensors 263, 264 would be reflected away from the detectors in those sensors. There must be sufficient specular reflection that some of the laser energy returns to its source. Preferably, the surfaces of sides 270, 271 are made as close to a "white paper surface"—i.e., a surface that, when excited by laser energy, re-emits omnidirectionally at the same wavelength as the incident beam—as possible. The two sensors 263, 264 should be far enough apart that reflected or re-emitted energy from side 270 does not reach the detector of sensor 264, and that reflected or re-emitted energy from side 271 does not reach the detector of sensor 263. Alternatively, the two sensors could operate at different wavelengths, so that the signal of one sensor could not be read by the other sensor.

The use of sensors 263, 264 instead of accelerometers 103, 104 provides displacement data directly, without the need for integration of acceleration data. However, as stated above, for purposes of this invention, acceleration measurements and displacement measurements yield the same results.

After the completion of all measurements at all angular positions, assembly 1877 or 261 is then removed manually from shaft 110.

The actuation of servo motor 1885 and the various cylinders/actuators is preferably automated under the control of processor 61, so that the multiple measurements can be taken quickly. If measurements are taken at every 10°, the full series of measurements preferably is completed within about two minutes or less, and preferably within about 30 seconds. If pneumatic cylinders are used as the actuators, the various pneumatic cylinders preferably are powered by compressor 2000, which preferably is located within enclosure 1801 and is connected to the various cylinders by hoses 2001. Enclosure 1801 may be used to house other components (not shown) of apparatus 1870.

Figure 21:
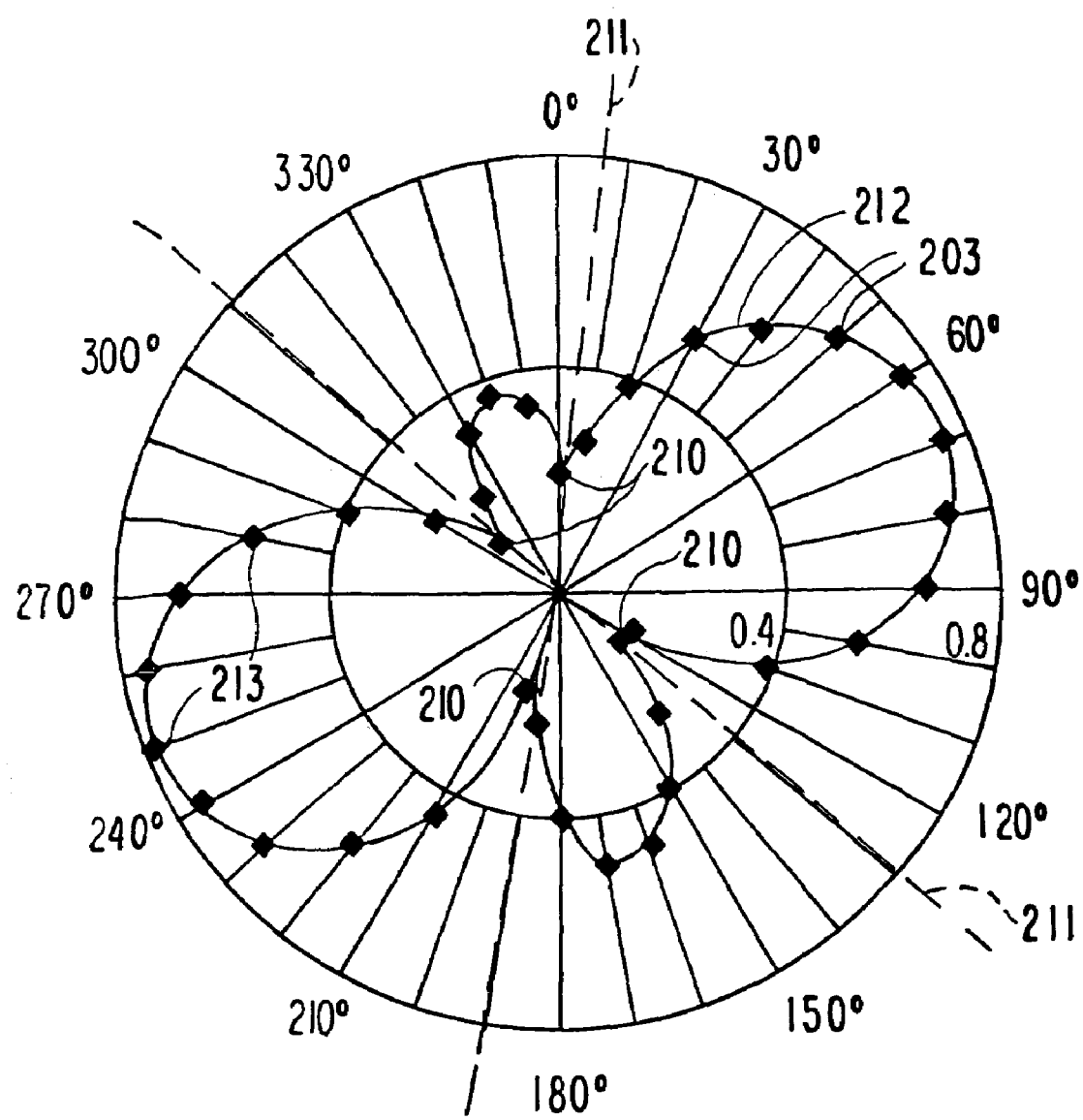
FIG. 21 is a plot of maximum out-of-plane acceleration or displacement, as a function of rotational angle, of a shaft tip during measurement using the apparatus of FIG. 18.

The result of the measurements is a tabulation, for each angular position, of tip position (particularly out-of-plane displacement) and vibration frequency. To locate the principal planar oscillation plane, the out-of-plane displacement may be plotted in polar coordinates as a function of angle. An example of such a plot is shown in FIG. 21. At each angular position, the distance of the curve from the origin represents the out-of-plane displacement at that angle. A typical golf club shaft will have a multi-lobed plot such as that shown in FIG. 21, although the number of lobes may vary among different shafts. The cusps 210 between the lobes, where the plotted curve approaches closer to the origin, are the local minima of out-of-plane displacement. Except for very anomalous shafts, the number of cusps 210 is expected to be even, and each cusp 210 at a particular angle should have a mate 180° away from it. Each such pair (indicated by dashed lines 211) represents one of the planar oscillation planes of the shaft, with the principal planar oscillation plane ordinarily being represented by that pair of cusps that are closest to the origin. It should be noted that by plotting the observed data graphically, the principal planar oscillation plane can be precisely located even if its position is not one of the angular positions at which measurements actually were taken. Processor 61 preferably is programmed with software to plot the data and select the principal planar oscillation plane automatically.

In a preferred embodiment, such software fits curve 212 to data points 213 using a Fourier series approximation. If, for each point 213 taken at a particular angle θ, the distance from the origin is indicated as r(θ), then points 213 can be fit to the following series:

$$r(\theta)=A_0+A_1 \cos\theta+B_1 \sin\theta+A_2 \cos(2\theta)+B_2 \sin(2\theta)+\ldots+A_m \cos(m\theta)+B_m \sin(m\theta)$$

where the closeness of the fit improves as the number of terms, m, increases. However, where N is the number of data points, the number of terms is limited:

$$m<(N-1)/2.$$

Thus, in the preferred embodiment, where the number of points is 36, the maximum number of terms is 17.

In the series above, the coefficients are defined as follows:

$$A_0 = (1/N) \sum_\theta r$$

(i.e., the average distance of points 221 from the origin);

$$A_j = (2/N) \sum_\theta y \cos(j\theta);$$

and $$B_j = (2/N) \sum_\theta y \sin(j\theta).$$

It has been observed empirically that a minimum of four terms (m=4) is needed for an acceptable curve fit. The fit improves as m increases.

Once curve 212 is fit to points 213, the first derivative is taken and set equal to zero to find the maxima (tips of the lobes) and the minima (cusps 210). The second derivative is then taken at each extremum to identify which is a minimum or cusp (positive second derivative) and which is a maximum (negative second derivative). It has been found that for curve fitting purposes, thirty-six data points (0° to 350°) should be used if the end points (0° and 360°) are to have the same slope and displacement, but thirty-seven points (0° to 360°) should be used for the derivatives.

The formulas for the first and second derivatives are as follows:

$$r'(\theta) = \sum_{j=1}^{m} (-A_1 j \sin(j\theta) + B_1 j \cos(j\theta))$$

$$r''(\theta) = \sum_{j=1}^{m} (-A_1 j^2 \cos(j\theta) - B_1 j^2 \sin(j\theta))$$

A commercial root-finding subroutine called ZREAL, which is available as part of the International Mathematical Subroutine Library, from Visual Numerics, Inc., of Houston, Tex., preferably is used to find the roots of the first derivative—i.e., the points at which the first derivative is equal to zero. This subroutine requires that initial guesses as to the number and locations of the roots be provided. Although it is known that there are normally eight roots (four maxima and four minima), it was found that guessing eight roots (which were arbitrarily guessed to be equiangularly spaced) did not find all roots. It was found instead that guessing that there are twenty equiangularly spaced roots yields the correct results. However, it was also found that for higher-order fits (m≧10), the curve fit so well that variations in the data created wiggles in the fitted curve that were read as local extrema, yielding additional roots. Therefore, m preferably should be less than 10; most preferably, m=7.

Once the roots are found, identifying the extrema, the second derivative at each root is taken, and those points at which the second derivative is positive are identified as minima. The lines connecting pairs of oppositely spaced minima are the planar oscillation planes, and the load data preferably are used as discussed above to identify the principal planar oscillation plane.

As stated above, vibration frequency is also recorded at each angular position. As also set forth above, the stiffness of the shaft can be derived from the vibration frequency using the relationship:

$$f \approx (k/M)^{0.5},$$

where k, the spring constant of the shaft in its transverse bending mode, is a measure of the shaft stiffness. M, the mass, is the total mass of the oscillating system, which, in this case, is the golf club shaft 110 plus the tip mass and sensor assembly 1877. Approximating golf club shaft 110 as a prismatic beam (i.e., a beam of constant cross section, which most golf club shafts in fact are not) of mass $m_{shaft}$ and assigning the tip mass a mass $m_{tip}$, then the total mass, M, in the relationship above can be approximated as M=0.23 $m_{shaft}+m_{tip}$. Therefore, the frequency can be approximated as:

$$f = (k/(0.23 m_{shaft}+m_{tip}))^{0.5}.$$

Solving for k yields:

$$k = (0.23 m_{shaft}+m_{tip})f^2.$$

Determining k provides a measurement of stiffness by which one shaft can be compared to another (assuming the same length of shaft is vibrating as discussed above). Determining k also allows one to determine the tip-to-butt deviation of the shaft based on the restoring force measurements gathered during the load test at the various angles. This deviation also can be determined using a travel gauge, or by using optical techniques, if preferred.

As set forth above, at each angle:

$$F/k = d+\delta,$$

where F is the measured restoring force and d is the displacement applied during the load test. If k is also known, δ, the deviation of the center of the shaft tip from a longitudinal axis passing through the center of the shaft butt, can be determined.

In an alternative and more particularly preferred embodiment, the deviation δ can be determined during a modified load test without first determining stiffness (as measured by the spring constant k). In this embodiment, cylinder 191 raises shaft 110 a first displacement $d_1$ and restoring force data are collected, and then cylinder 191 raises shaft 110 to a second displacement $d_2$ and restoring force data are again collected. The two restoring force data points for each angular position can be captured by moving cylinder 191 up and down at each angular position at which oscillation data are collected. More preferably, the restoring force data points are captured as part of a modified version of the load test described above, in which cylinder 191 is moved to position $d_1$ and shaft 110 is rotated through at least 360° while data are captured, with cylinder 191 then being moved to position $d_2$ and shaft 110 again rotated through at least 360° while again data are captured. In a particularly preferred embodiment, data are captured at displacement $d_1$ as shaft 110 is rotated in a first direction through at least 360°—e.g., through about 400°, and data are again captured at displacement $d_2$ as shaft 110 is rotated in a second, opposite direction through the same total angular displacement. This provides two equations in two unknowns—k and δ—which can be solved for δ:

$$F_1 = k(d_1+\delta)$$

$$F_2 = k(d_2+\delta)$$

k=k, ∴

$$F_1/(d_1+\delta)=F_2/(d_2+\delta)$$

$$F_1 d_2 + F_1 \delta = F_2 d_1 + F_2 \delta$$

$$\delta = (F_2 d_1 - F_1 d_2)/(F_1 - F_2)$$

Because the load test is being carried out with the tip mass attached, the weight of the tip mass preferably is subtracted from the measured restoring force. The load test data measured at a particular position are recorded for a different position 90° from the particular position at which the measurement is being taken, to account for the fact that the load test is conducted vertically while the planar oscillation plane location measurement for the same angular position is carried out horizontally.

Figure 22:
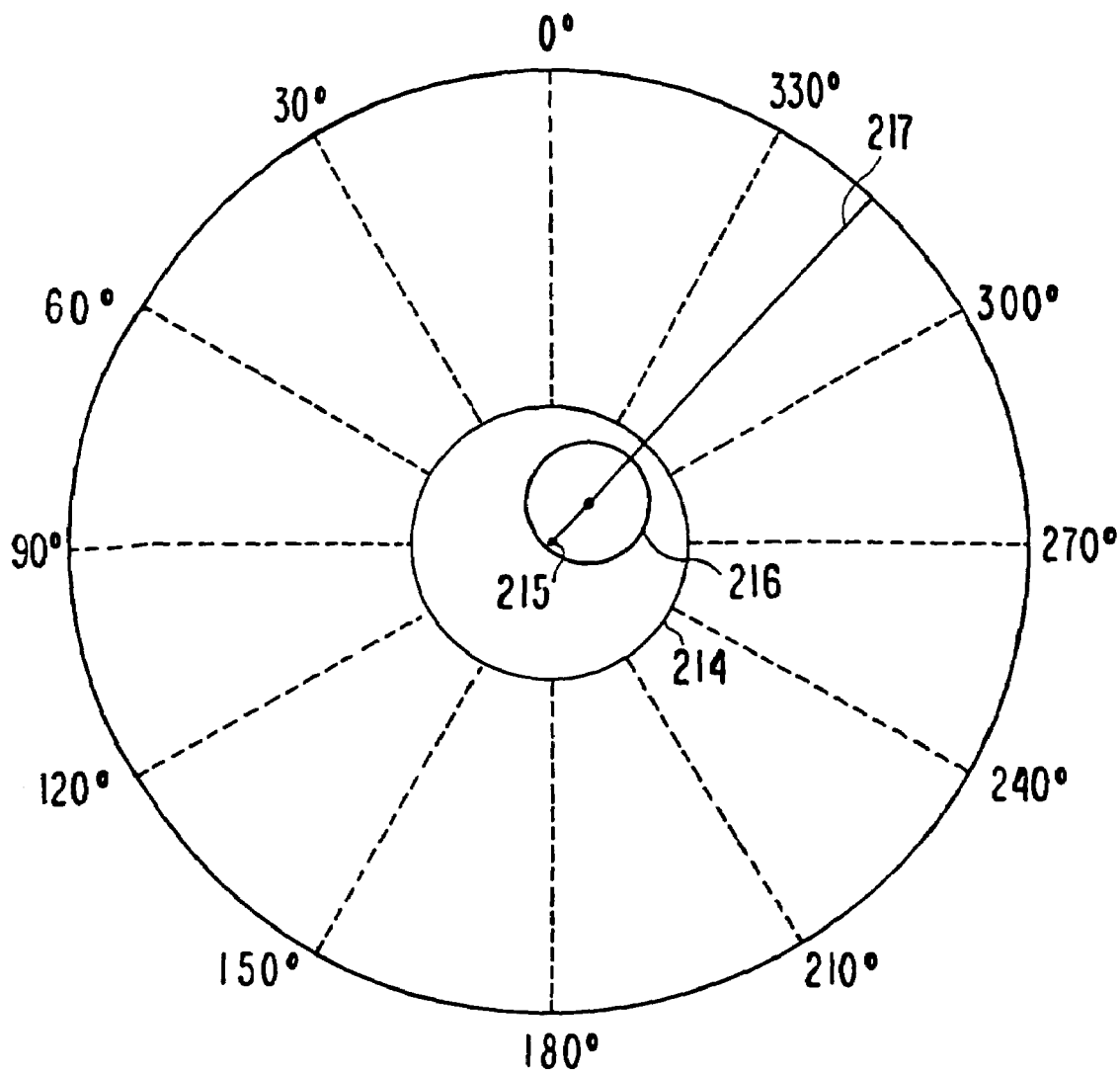
FIG. 22 is a plot, as a function of angle, of the deviation of the tip center of a typical golf club shaft from a longitudinal axis passing through the center of the shaft butt, as measured using the apparatus of FIG. 18.

Typically, when δ is plotted as a function of angle, the result can be represented, as shown in FIG. 22, a larger circle 214 centered on the origin 215 and a smaller circle 216 offset from origin 215. The relationship of the diameters of the larger and smaller circles is proportional to the relationship of the diameters of the butt and tip ends of shaft 110, and in a preferred embodiment the diameters of the respective circles are equal to the diameters of the respective ends. Thus, this plot represents the location of the tip end relative the longitudinal axis of shaft 110, or in other words the extent to which shaft 110 is not straight. The line 217 represents the direction of the bend. That the restoring force data from the load test provides this result is to be expected. If a golf club shaft is bent in a particular direction, then applying a force during a load test in the direction of the bend will result in a smaller restoring force than if the applied force is applied against the direction of the bend. Thus, for each angle, if the restoring force is relatively small, then for an angle 180° away, the restoring force will be relatively large, and vice-versa.

The process and apparatus according to the present invention can be used as part of a larger process or apparatus for assembling golf clubs, to produce "spine-aligned" golf clubs. Thus, each golf club shaft 110, having been marked with a reference mark at a predetermined location relative to the location of the preferred orientation, or planar oscillation plane (whether or not marked to indicate the "hard" side), can be passed to a golf club assembly station where the marking on the shaft is identified and used to assemble a golf club with the planar oscillation plane preferably substantially perpendicular to the golf club face. Depending on the relative speeds of planar oscillation plane locating apparatus 60 or 1870 as compared to the golf club assembly station, more or fewer planar oscillation plane locating stations or assembly stations, as may be appropriate, can be provided. Thus, several planar oscillation plane location stations 60, 1870 may be used to feed a single golf club assembly station. A hopper may be provided at the golf club assembly station to act as a buffer in case the assembly station slows down or stops, or is not ready to accept a new golf club shaft 110 the moment the shaft arrives.

The golf club assembly station preferably is equipped with a scanner for identifying the mark made on golf club shaft 110 indicating the location of the planar oscillation plane. Once that mark has been identified, shaft 110 is rotated so that the mark is in a predetermined orientation for the type of golf club head to be attached to shaft 110, and that golf club head is held in a predetermined orientation as shaft 110 is assembled to the golf club head.

Alternatively, each golf club head could be provided with an alignment marking to which the marking on golf club shaft 110 must be matched. A scanner scans for the alignment marks on both shaft 110 and the golf club head and rotates shaft 110 until the two markings are aligned. This eliminates the need for the golf club head holding mechanism to "know" a specific orientation in which to hold each different type of golf club head for alignment with the marked shaft. Instead, each golf club head can be held in the same orientation, and as shaft 110 is brought close for assembly, shaft 110 can be rotated until the marking on shaft 110 and the marking on the golf club head are in desired alignment before shaft 110 is joined to the golf club head.

Figure 23:
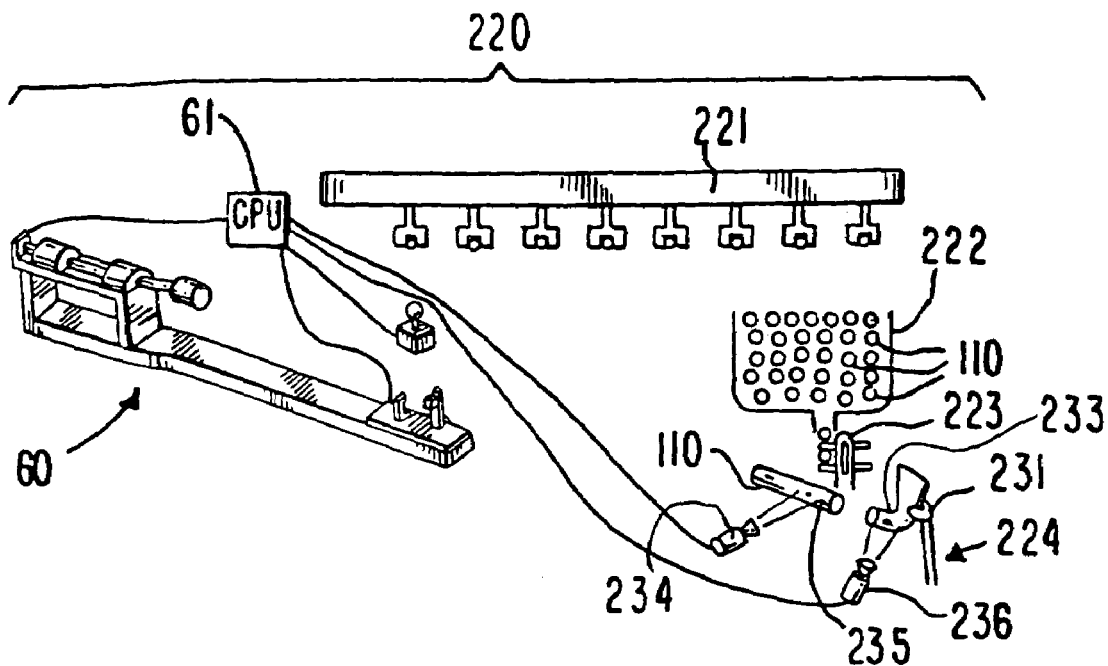
FIG. 23 is a diagrammatic view of apparatus according to the invention for assembling golf clubs.
Figure 24:
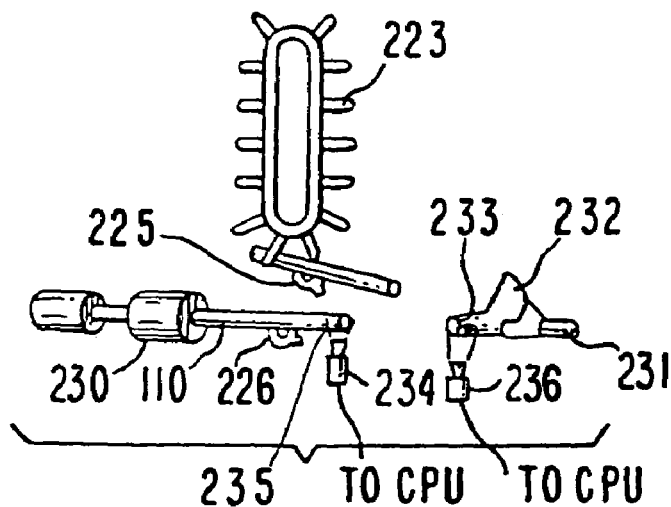
FIG. 24 is a close-up view of an assembly station of the apparatus of FIG. 23.

Apparatus 220 for assembling golf clubs in accordance with the present invention is shown in FIGS. 23 and 24. Apparatus 220 includes at least one apparatus 60 or 1870 (one apparatus 60 shown), a conveyor 221 for removing completed shafts 110 from apparatus 60, 1870 and depositing them in a hopper 222, a feed mechanism 223 for feeding each shaft 110 from hopper 222 to assembly station 224, and assembly station 224 itself.

At assembly station 224, a feeder including arms 225 connected to a motor (not shown) delivers shaft 110 to chuck 230, similar to chucks 76, 1876 which rotatably holds shaft 110 from its proximal end. Gripper 231 holds a golf club head 232, which may or may not bear an alignment marking 233; if there is no alignment marking 233, golf club head 232 is held by gripper 231 in a known position, which may differ for different types of golf club heads. A scanner 234 scans shaft 110 for marking 235 as chuck 230 rotates. When scanner 234 identifies marking 235, processor 61 instructs chuck 230 to align marking 235 with alignment marking 233 located by scanner 236, or with a predetermined orientation for golf club head 232. Chuck 230 and gripper 231 are then moved together by moving one or both thereof, and shaft 110 is joined to golf club head 232 in an otherwise conventional way, using whatever adhesives, ferrules, etc. as may be necessary.

Figure 25:
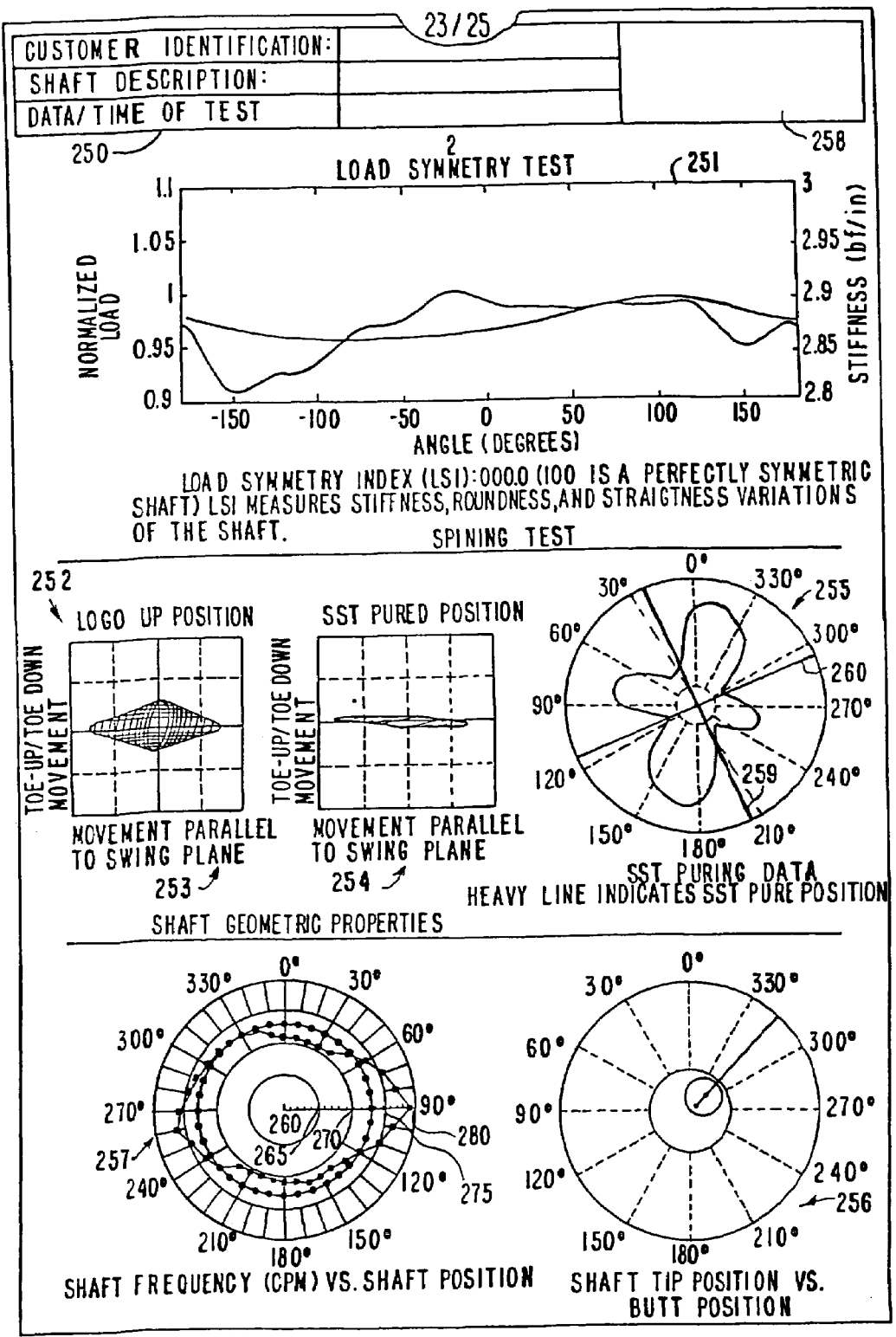
FIG. 25 is a sample of a printout used to demonstrate the results of testing of an individual shaft.

FIG. 25 is a sample of a printout that may be provided to a customer in the case of a golf club retrofit, giving various characteristics of the shaft and comparing the club's original configuration to its new configuration. This printout provides information for the consumer regarding the characteristics of the golf club, and also provides a data bank of information for the retrofitter regarding each club that has been retrofitted.

Although the data are laid out in a particular arrangement in FIG. 25, other arrangements are possible and would be within the scope of the invention. Customer and shaft identification data are preferably provided in field 250. Included in the identification data preferably is a bar code or other machine-readable indicium (not shown), which may be placed in box 258 of field 250 and which can be used to recall data for the particular shaft from a data repository. A matching bar code or other indicium could be applied to the shaft itself. In particular, if a label is used to apply alignment markings to the shaft as described above, that label could also bear the indicium.

The printout preferably includes a graph 251 showing the results of the load test discussed above. In particular, the load symmetry index (LSI) discussed above is reported, and the normalized load during the load test is correlated to stiffness in foot-pounds per inch. The results of the "spining" or planar oscillation plane location measurements are shown at 252. In particular, two phase plots 253, 254 are presented to show, respectively, the shaft vibration characteristics in the "logo-up" position and in the principal planar oscillation plane as located. A plot 255, similar to FIG. 21, is also provided, except that while lines 259, 260 representing all planar oscillation planes preferably are displayed, preferably line 259 representing the principal planar oscillation plane is heavier or otherwise differentiated from any other line 260. Similarly, a plot 256, like that of FIG. 22, is also provided to show the straightness of the shaft, and plot 257 showing vibration frequency (a measure of stiffness) as a function of angular position is also provided. In plot 257, circular data points represent a "perfect" shaft in which the stiffness, and hence the frequency, is the same at all angles, while the square data points show the frequency data for the shaft being measured.

While the invention has been described so far in terms of golf club shafts, it can be used to determine the symmetry/asymmetry, roundness, straightness and/or stiffness of any elongated member, including, but not limited to, baseball bats, billiard cues, arrows, fishing rods, or any structural member.

Thus it is seen that a method and apparatus for quickly and reliably determining the preferred angular orientation of a golf club shaft or other elongated member, and for using the determination of the preferred angular orientation to automatically assemble golf clubs with each respective golf club shaft consistently aligned relative to the respective club face, are provided. One skilled in the art will appreciate that the present invention can be practiced by other than the described embodiments, which are presented for purposes of illustration and not of limitation, and the present invention is limited only by the claims which follow.

What is claimed is:

1. A method of determining a preferred angular orientation of a golf club shaft about a longitudinal axis thereof, said golf club shaft having a proximal end for gripping by a golfer and a distal end for attachment to a golf club head, said method comprising:
   immobilizing said proximal end of said golf club shaft;
   mounting a reaction mass on said distal end of said golf club shaft;
   initiating vibratory motion, in a plane, of said distal end of said golf club shaft, by:
   displacing said distal end of said golf club shaft by attracting said reaction mass with an electromagnet, and
   deactivating said electromagnet;
   measuring said vibratory motion;
   analyzing said measured vibratory motion; and
   calculating from said analyzed vibratory motion said preferred angular orientation.

2. Apparatus for determining a preferred angular orientation of a golf club shaft about a longitudinal axis thereof, said golf club shaft having a proximal end for gripping by a golfer and a distal end for attachment to a golf club head, said apparatus comprising:
   means for immobilizing said proximal end of said golf club shaft;
   a reaction mass for mounting on said distal end of said golf club shaft;
   means for initiating vibratory motion, in a plane, of said distal end of said golf club shaft, by:
   displacing said distal end of said golf club shaft by attracting said reaction mass with an electromagnet, and
   deactivating said electromagnet;
   measuring said vibratory motion;
   analyzing said measured vibratory motion; and
   calculating from said analyzed vibratory motion said preferred angular orientation.

3. Apparatus for determining a preferred angular orientation of a golf club shaft about a longitudinal axis thereof, said golf club shaft having a proximal end for gripping by a golfer and a distal end for attachment to a golf club head, said apparatus comprising:
   a clamp for immobilizing said proximal end of said golf club shaft;
   a reaction mass for mounting on said distal end of said golf club shaft;
   a vibration generator for initiating vibratory motion, in a plane, of said distal end of said golf club shaft, by:
   displacing said distal end of said golf club shaft by attracting said reaction mass with an electromagnet, and
   deactivating said electromagnet;
   a detector for measuring said vibratory motion;
   an analyzer to analyze said measured vibratory motion; and
   a calculator to calculate from said analyzed vibratory motion said preferred angular orientation.

4. A method of determining a preferred angular orientation of a structural member about a longitudinal axis thereof, said structural member having a proximal end and a distal end, said method comprising:
   immobilizing said proximal end of said structural member;
   mounting a reaction mass on said distal end of said structural member;
   initiating vibratory motion, in a plane, of said distal end of said structural member, by:
   displacing said distal end of said structural member by attracting said reaction mass with an electromagnet, and
   deactivating said electromagnet;
   measuring said vibratory motion;
   analyzing said measured vibratory motion; and
   calculating from said analyzed vibratory motion said preferred angular orientation.

5. Apparatus for determining a preferred angular orientation of a structural member about a longitudinal axis thereof, said structural member having a proximal end and a distal end, said apparatus comprising:
   means for immobilizing said proximal end of said structural member;
   a reaction mass for mounting on said distal end of said structural member;
   means for initiating vibratory motion, in a plane, of said distal end of said structural member, by:
   displacing said distal end of said structural member by attracting said reaction mass with an electromagnet, and
   deactivating said electromagnet;

measuring said vibratory motion;

analyzing said measured vibratory motion; and calculating from said analyzed vibratory motion said preferred angular orientation.

6. Apparatus for determining a preferred angular orientation of a structural member about a longitudinal axis thereof, said structural member having a proximal end and a distal end, said apparatus comprising:

a clamp for immobilizing said proximal end of said structural member;

a reaction mass for mounting on said distal end of said structural member;

a vibration generator for initiating vibratory motion, in a plane, of said distal end of said structural member, by:

displacing said distal end of said structural member by attracting said reaction mass with an electromagnet, and deactivating said electromagnet;

a detector for measuring said vibratory motion;

an analyzer to analyze said measured vibratory motion; and a calculator to calculate from said analyzed vibratory motion said preferred angular orientation.

* * * * *

UNITED STATES PATENT AND TRADEMARK OFFICE
CERTIFICATE OF CORRECTION

PATENT NO. : 6,997,056 B2  Page 1 of 1
APPLICATION NO. : 11/144273
DATED : February 14, 2006
INVENTOR(S) : Richard M. Weiss et al.

It is certified that error appears in the above-identified patent and that said Letters Patent is hereby corrected as shown below:

In The Drawings
FIG. 15, in box 150, "RESTAINING" should be --RESTRAINING --.

FIG. 16, in box 163, "DISPLACMENT" should be --DISPLACEMENT --.

FIG. 17, in box 1701, "FREQUENCES" should be -- FREQUENCIES --

FIG. 25, in the caption under the LOAD SYMMETRY TEST results, "STRAIGTNESS" should be -- STRAIGHTNESS --.

Column 1, line 8, "of," should be -- of copending, --.

Column 4, line 27, after "is" should be inserted -- a --;
   line 30, "location" should be -- locating --.

Column 7, line 55, "if" should be -- is --.
   line 58, after "number" should be inserted -- of --.

Column 10, line 37, after "long" should be inserted -- as --.

Column 15, line 3, "144," should be -- 144 is performed, --.

Column 16, line 67, "proceed" should be -- proceeds --.

Column 19, line 10, "to" should be -- so --.

Signed and Sealed this

Fifteenth Day of August, 2006

JON W. DUDAS
*Director of the United States Patent and Trademark Office*